United States Patent [19]

Horvat

[11] Patent Number: 4,591,823

[45] Date of Patent: May 27, 1986

[54] TRAFFIC SPEED SURVEILLANCE SYSTEM

[76] Inventor: George T. Horvat, 1319 S. 102 St., West Allis, Wis. 53214

[21] Appl. No.: 609,195

[22] Filed: May 11, 1984

[51] Int. Cl.[4] .................... B60Q 1/00

[52] U.S. Cl. .................... 340/53; 340/52 R; 340/905

[58] Field of Search .................... 340/53, 52 R, 52 F, 340/905, 933, 936; 307/10 R; 180/167, 169, 170, 271

[56] References Cited

U.S. PATENT DOCUMENTS

| | | | |
|---|---|---|---|
| 3,137,538 | 6/1964 | Handschin | 346/18 |
| 3,283,297 | 11/1966 | Pfennighausen et al. | 340/905 |
| 3,377,616 | 4/1968 | Auer, Jr. | 340/989 |
| 4,007,438 | 2/1977 | Protonantis | 340/62 |
| 4,023,017 | 5/1977 | Ceseri | 364/437 |
| 4,068,211 | 1/1978 | Van Tol | 340/933 |
| 4,229,727 | 10/1980 | Gilhooley | 340/53 |

*Primary Examiner*—James L. Rowland

*Assistant Examiner*—Chi K. Lau

*Attorney, Agent, or Firm*—Andrus, Sceales, Starke & Sawall

[57] ABSTRACT

A traffic speed surveillance system is provided by a set of monitor transceivers (8, 10 and 12) located along a roadway (14) and communicating with a central processor (22), and including at least some stationary transceivers (8 and 10) sending radio signals indicative of speed limit in the location of the particular stationary transceiver. A vehicle transceiver (6) mounted in a vehicle (2) includes means for entering driver identification (36) and vehicle identification (48), and speedometer means (46) for measuring the speed of the vehicle. The vehicle transceiver receives the radio signals from the monitor transceiver indicative of speed limit and compares measured speed against the limit, and sends radio signals indicative of driver identification, vehicle identification and speed limit violation to the monitor transceiver for reporting to the central processor.

19 Claims, 32 Drawing Figures

FIG. 1
FIG. 1a
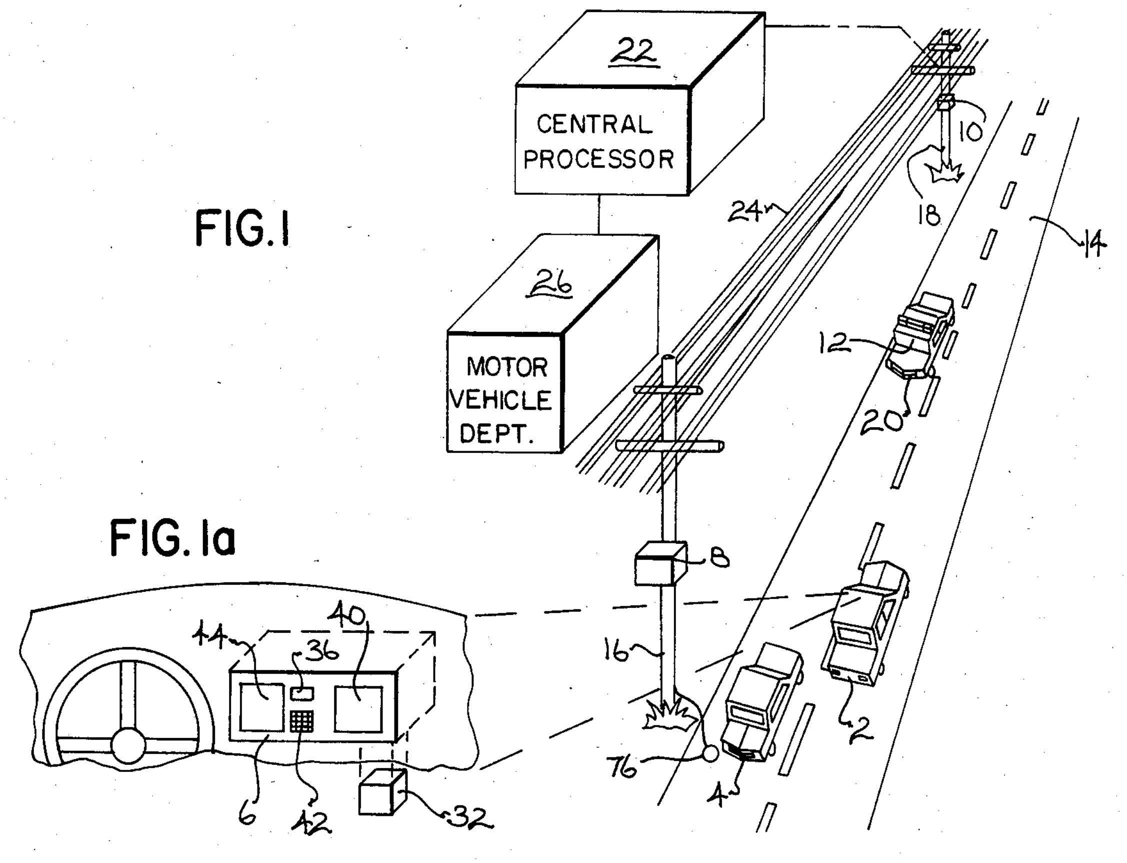
FIG. 2
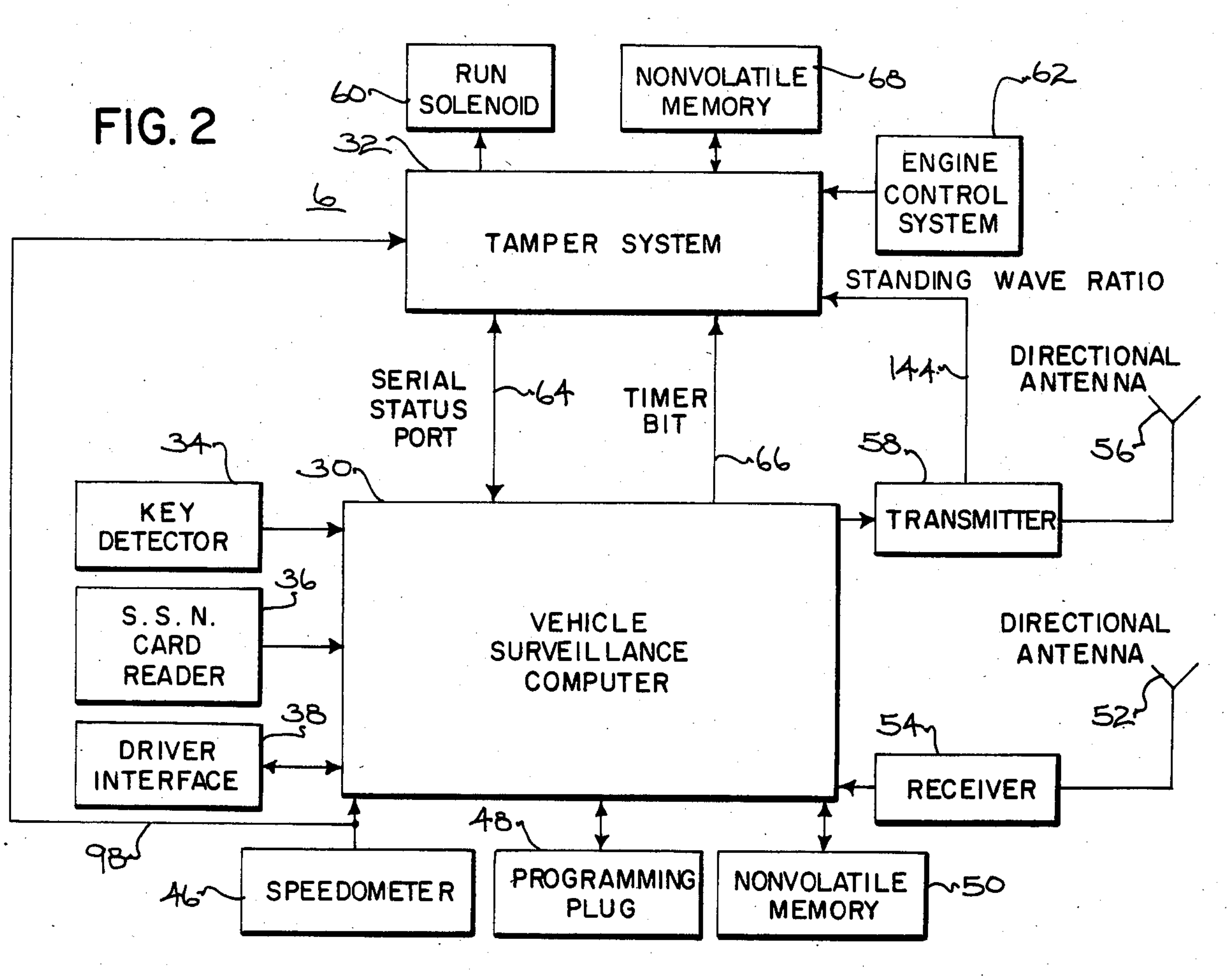

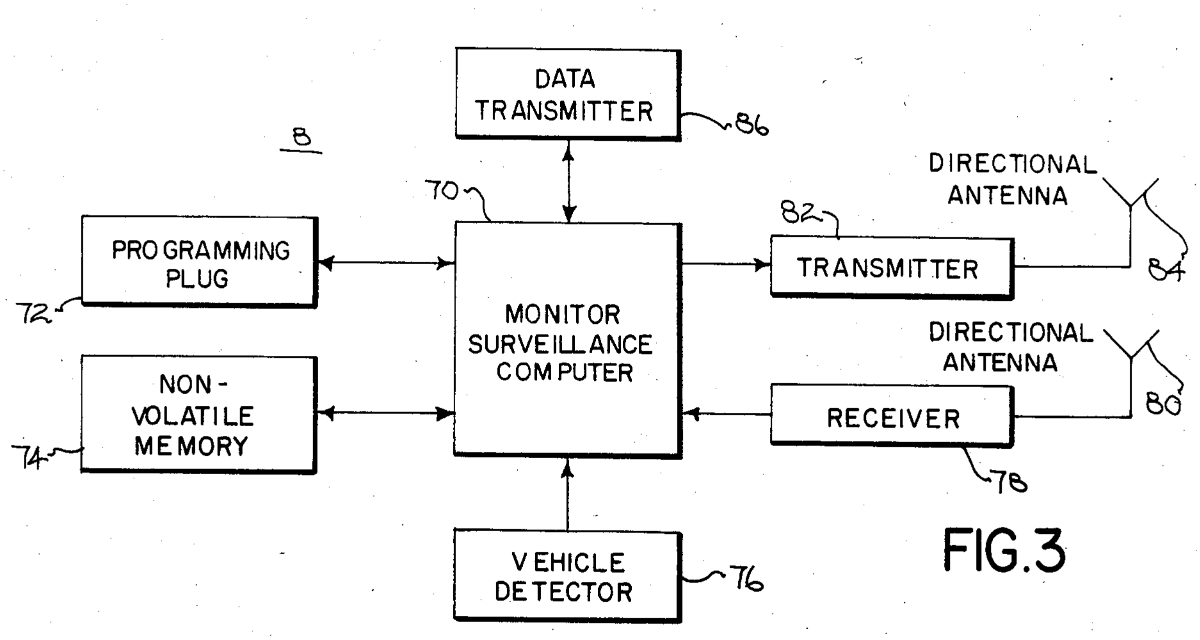
FIG.3
FIG.4
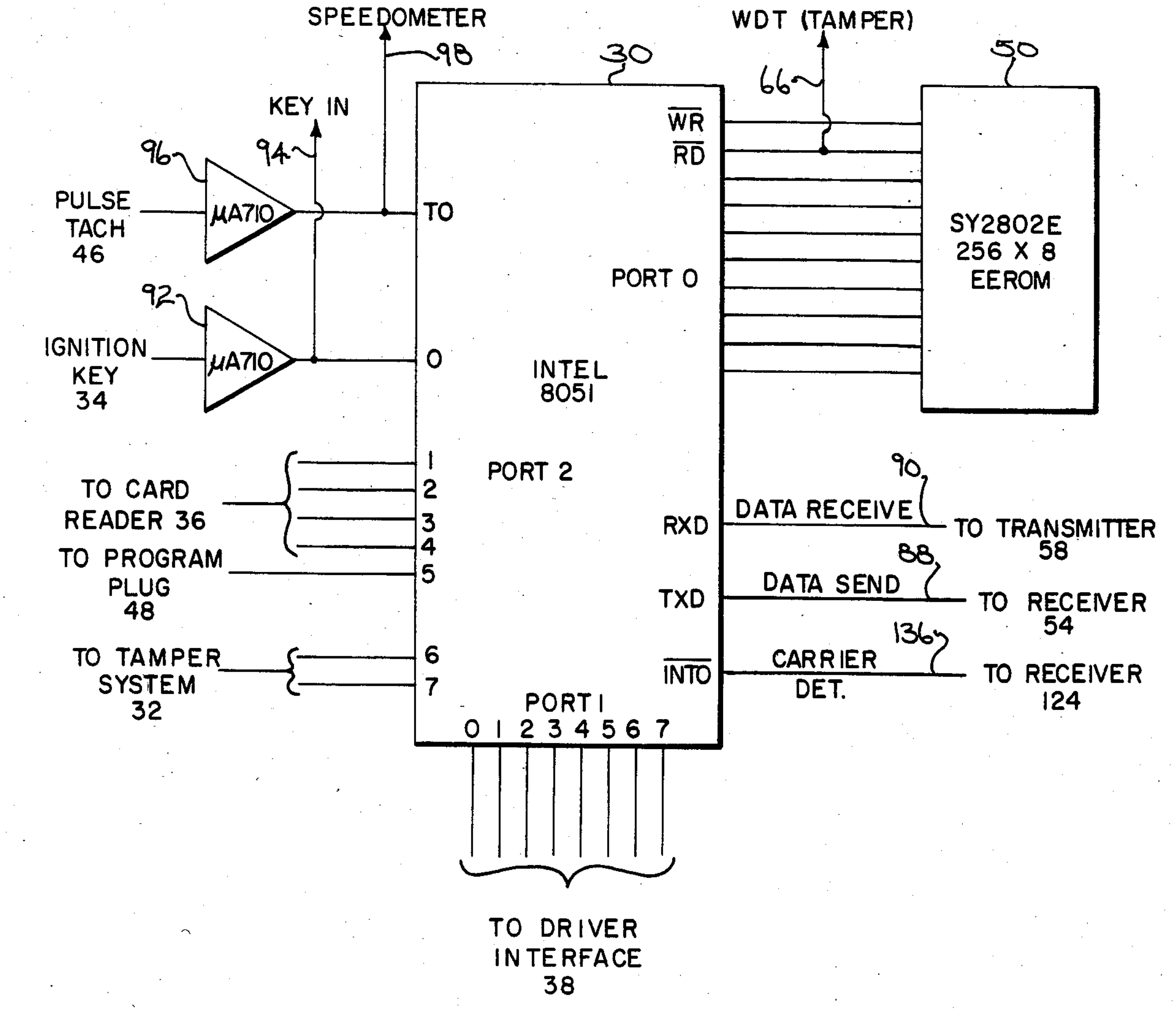

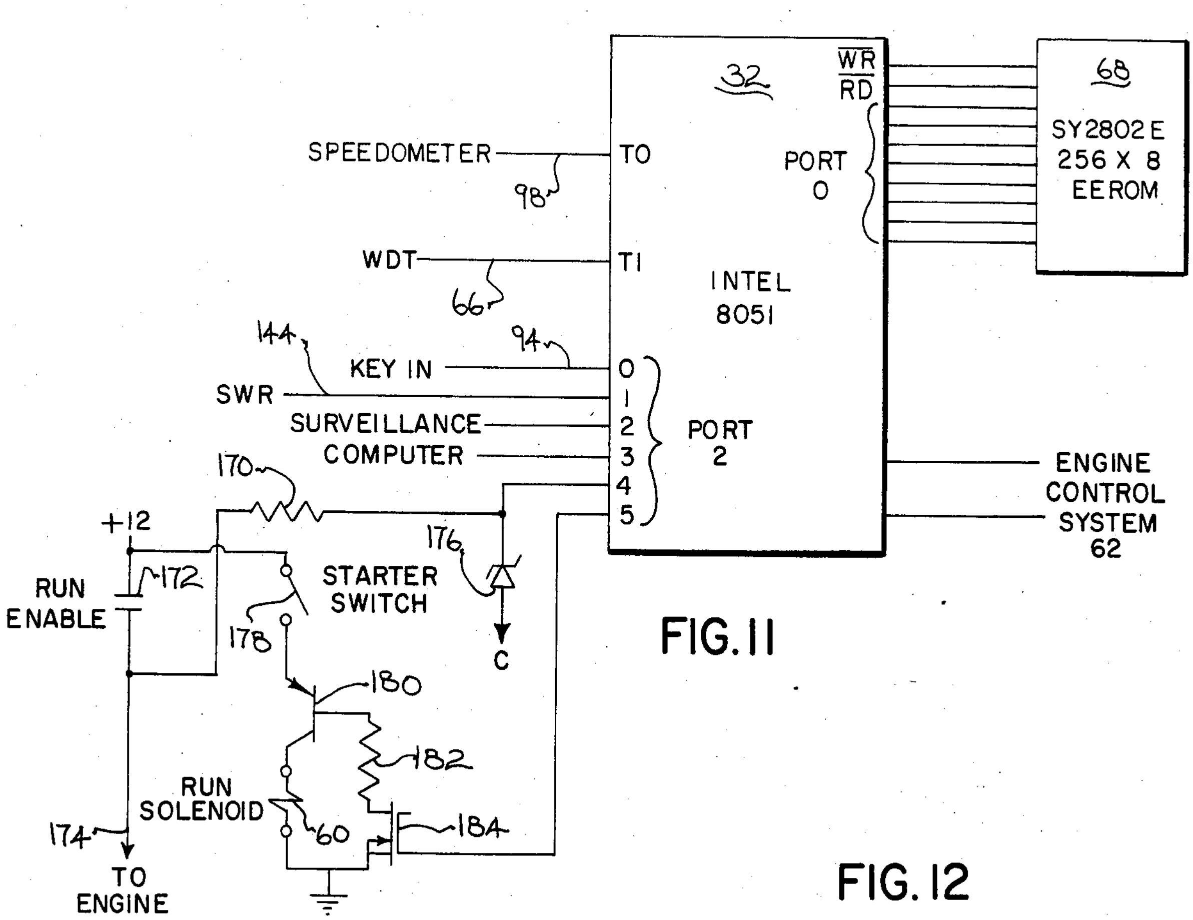
FIG. 11
FIG. 12
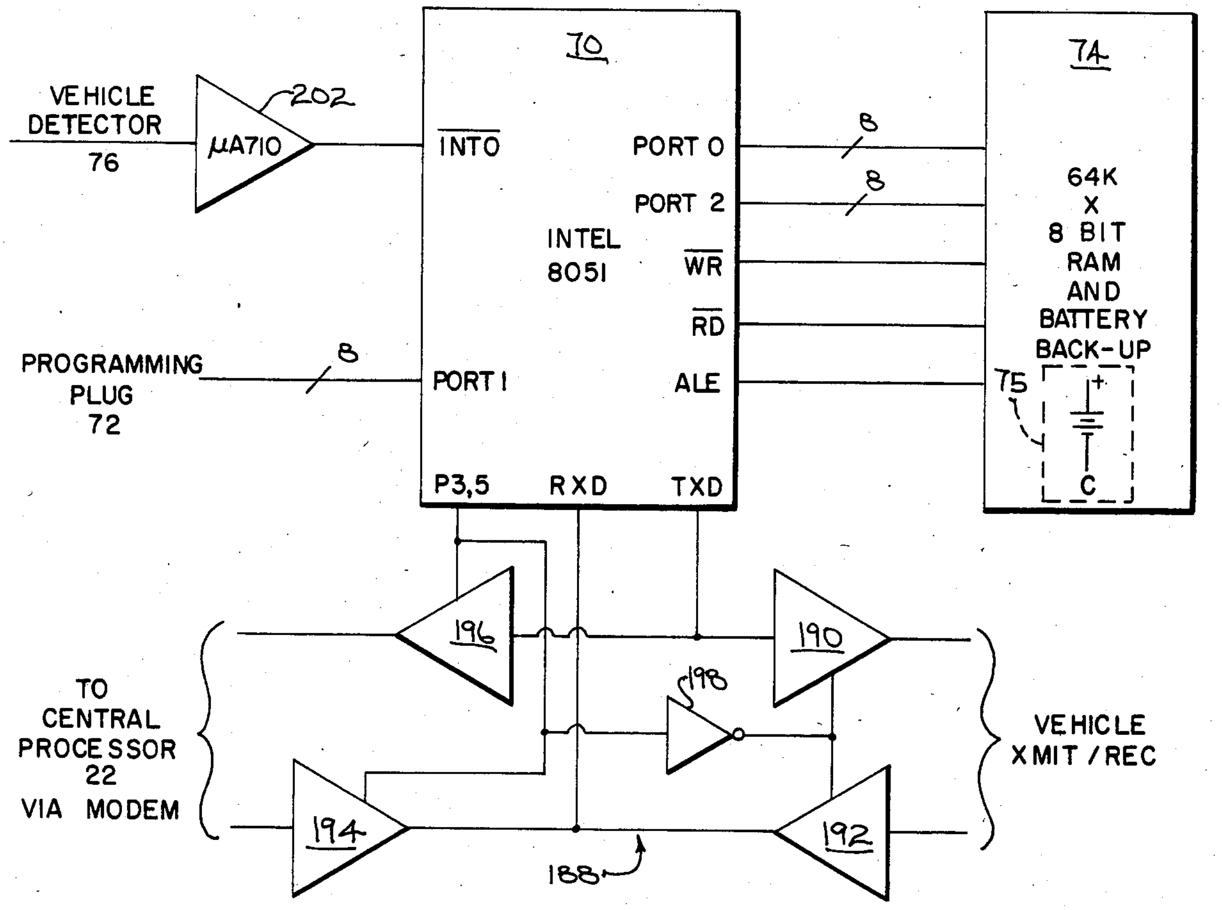

VEHICLE SURVEILLANCE COMPUTER MAIN LOOP

START UP ROUTINE

CHECK FOR VIOLATION

STOP ROUTINE FIGURE 19

VIOLATION REPLY INTERRUPT ROUTINE

VEHICLE TRANSMIT DATA ROUTINE

VEHICLE TAMPER COMPUTER ROUTINE

VEHICLE TAMPER COMPUTER ROUTINE

VEHICLE TAMPER COMPUTER ROUTINE

FIG. 25
MONITOR COMPUTER MAIN LOOP
FIGURE 25
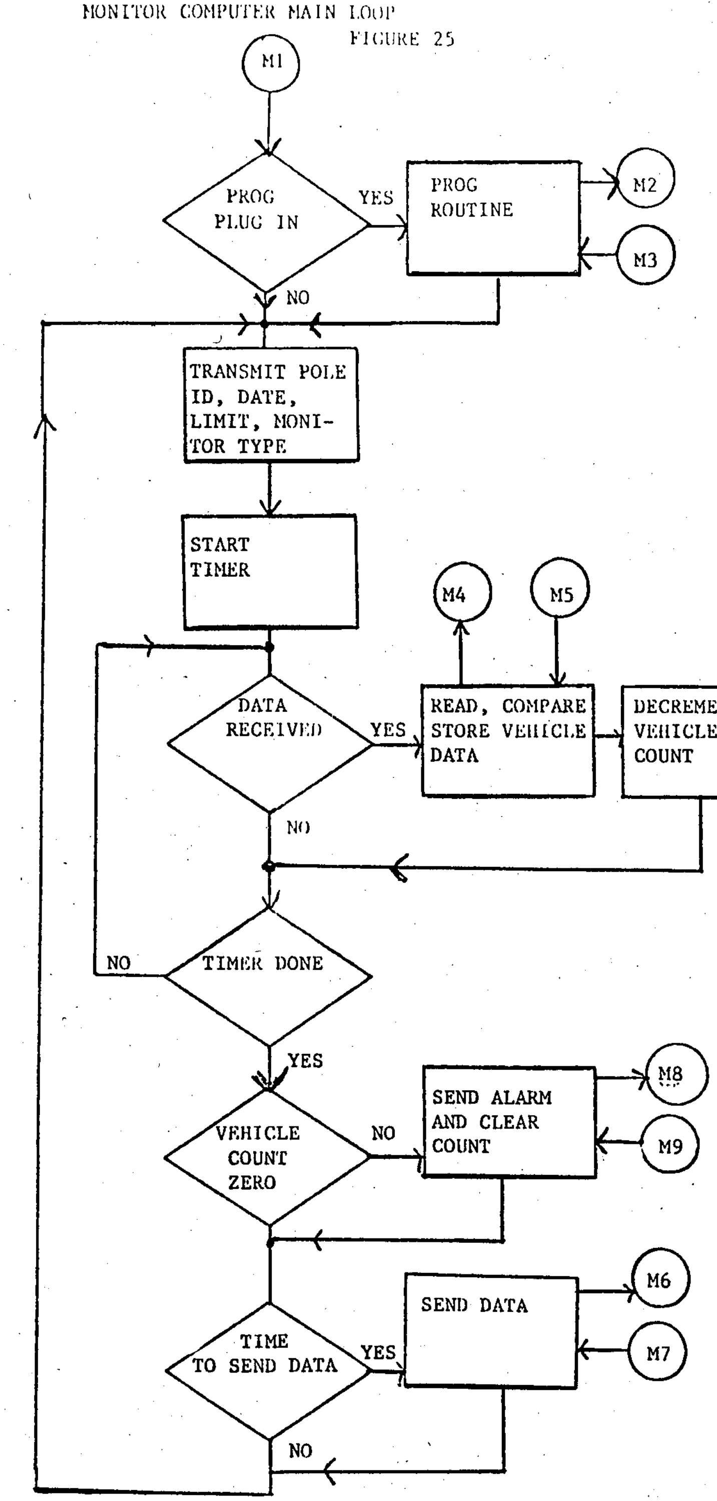
FIG. 27
VEHICLE COUNTER INTERRUPT ROUTINE
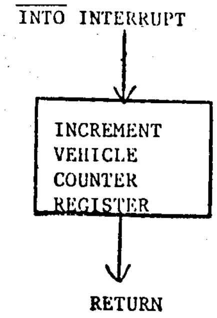
FIG. 26
TIME OF DAY INTERRUPT ROUTINE
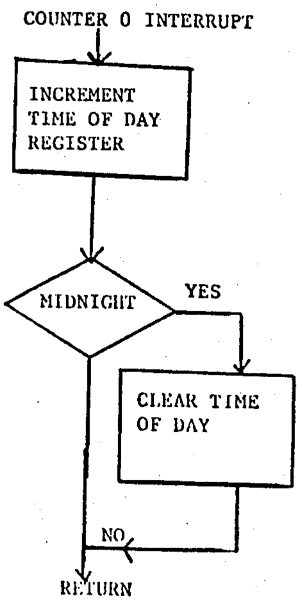

MONITOR SEND DATA ROUTINE

MONITOR SEND ALARM ROUTINE

TRAFFIC SPEED SURVEILLANCE SYSTEM

BACKGROUND AND SUMMARY

The present invention relates to a surveillance system for monitoring traffic speed, and for recording and reporting speed limit violations.

Each motorized vehicle contains a transceiver for radio communication with a plurality of monitor transceivers fixed along a highway and/or mounted in police patrol cars. The monitor transceivers are coupled through conventional telephone lines, radio communication or the like, to a central processor which can be accessed by the motor vehicle department or other authorities. The vehicle transceiver communicates with the speedometer or other velocity detector for determining vehicle speed. The vehicle transceiver includes a preset codable input which is coded with the vehicle license number or other vehicle identification, and may be entered and accessed only by authorized personnel, such as the motor vehicle department. The vehicle transceiver also includes a second preset codable input which is selectively insertable by a driver by way of a magnetically readable card, keyboard entry, or the like, and contans driver identification such as social security number, driver's license or the like, and may have a plurality of authorized codes according to the number of authorized drivers. These codes are a conditon precedent to vehicle operation.

The monitor transceivers broadcast information including the speed limit for the given locale. The vehicle transceiver compares the received speed limit information against vehicle speed. A visual and/or audio warning may be given to the driver if the differential is below a set threshold. If the vehicle speed exceeds the speed limit by an amount greater than the given threshold, then a violation communication is issued. The vehicle transceiver sends speed limit violation information to the monitor transceiver, including the driver's identity by social security number or the like, and the vehicle identity, by license number or the like, together with the speed of the vehicle.

A self-contained tamper unit is provided in the vehicle transceiver separate from but communicating with the vehicle surveillance computer in the vehicle. The tamper system checks proper operation of the vehicle surveillance computer and various peripherals such as the speedometer, run enable circuitry to the engine, and the like, for securing against tampering or other defeating of the system, by preventing operation of the vehicle and/or by issuing a tamper alarm signal. Tamper events are stored in a separate nonvolatile memory for later verification and corroboration, and apprehension if appropriate. The tamper system also monitors engine RPM and the gear to check the integrity of the speedometer within given limits. When the vehicle transceiver is transmitting, the tamper system checks the standing wave ratio at the transmission antenna to determine proper transmission. The tamper system checks for proper operation of the vehicle surveillance computer by measuring the amount of time the vehicle surveillance computer takes to send a signal to the tamper system, and if the time is too short or too long, improper operation is detected. If any of these and various other checks signifies failure of one or more components, the tamper system records such event and optionally disables operation of the vehicle.

The vehicle transceiver continuously listens for the command frequency from monitor transceivers. The monitor transceivers may continuously transmit speed limit and vehicle reply commands, or may start to transmit such commands only when a vehicle is detected. When the vehicle transceiver detects command signals from the monitor transceiver, a delay may be initiated, at the end of which the vehicle listens for transmissions from other vehicles, and if such are detected, the vehicle restarts its delay and listens again at the end thereof, and repeats the sequence until there is clear air space for responding to the monitor transceiver. This prevents multiple responding transmissions from the vehicles to the monitor transceiver which would cause garbled interference. Multiple frequencies may of course be used, though a single reply frequency is desired for economy. The noted delay reduces the probability of simultaneous transmission by several vehicles back to the monitor transceiver. In one form, a particular dedicated delay is provided for each vehicle by using the sum of the social security number digits for determining the delay. For example, the probability of two vehicle drivers having the same social security number sum is about three in ten thousand. The chance that these drivers would be in the same locality is extremely remote. In addition to the violation being transmitted to the monitor receiver, the violation is also stored in nonvolatile memory on-board the vehicle surveillance computer system for later retrieval and documented corroboration.

The system preferably operates on two frequencies. The first is the vehicle transmit frequency which is the same for all vehicles and which is the monitor receive frequency. The second frequency is the vehicle receive frequency which is the same for all vehicles and which is the monitor transmit frequency. The vehicle has a transmitter for the transmit frequency and a receiver for the receive frequency. The vehicle has a second receiver at the vehicle transmit frequency for carrier detection of other vehicle transmissions at the end of the noted particular vehicle reply delay. A second transmitter may be incorporated on a dedicated alarm or tamper frequency for transmission to the monitor transceiver which would then include a second receiver at the dedicated alarm frequency. The system preferably uses directional antennas.

A stationary or fixed pole type monitor transceiver receives all vehicle transmissions but records only the given speed limit violation and stores such data along with the time and date for subsequent transmission to a central processor or assigned authorities. This transmission may be via phone lines through an auto-dial modem, with re-dial if busy, or by radio transmitter operating at the violation collection frequency, or cable TV channels, or the like. If the monitor transceiver is of the type issuing reply commands to vehicles only when a vehicle is detected, the absence of a reply from a passing vehicle indicates improper operation and/or tampering with the vehicle's velocity surveillance system, and this information is immediately transmitted to a central processor or the given authorities. In addition, the monitor sends a signal to the vehicle that it is not operating properly, which if received is stored in nonvolatile memory in the tamper system of the vehicle. The monitoring transceivers may additionally or alternatively be mounted in police patrol cars.

BRIEF DESCRIPTION OF THE DRAWINGS

FIG. 1 is a schematic illustration of a traffic speed surveillance system in accordance with the invention.

FIG. 1a is a schematic illustration of the dashboard of a vehicle of FIG. 1.

FIG. 2 is a schematic block diagram of the vehicle transceiver of FIG. 1.

FIG. 3 is a schematic block diagram of the monitor transceiver of FIG. 1.

FIG. 4 is a schematic circuit diagram of the vehicle surveillance computer and peripherals of FIG. 2.

FIG. 11 is a schematic circuit diagram of the tamper system computer of FIG. 2 and peripherals.

FIG. 12 is a schematic circuit diagram of the monitor surveillance computer of FIG. 3 and peripherals.

FIG. 25 is the monitor surveillance computer main loop program flowchart.

FIG. 26 is the monitor time of day interrupt routine.

FIG. 27 is the monitor vehicle counter interrupt routine.

DETAILED DESCRIPTION

Figure 5:
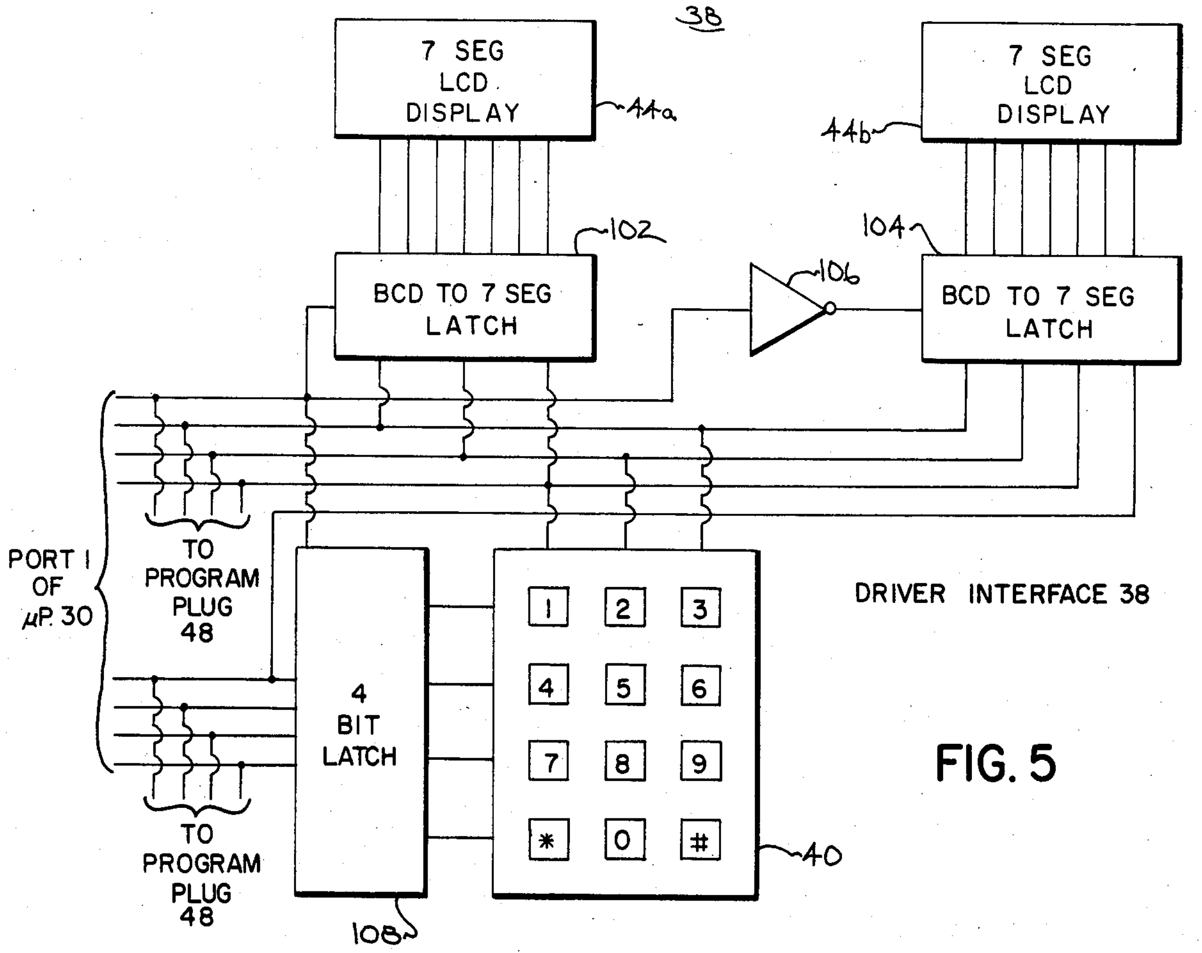
FIG. 5 is a schematic circuit diagram of the driver interface of FIG. 2.

FIG. 1 shows a traffic speed surveillance system in accordance with the invention. Each vehicle such as 2 and 4 contains a transceiver 6 which is designed to transceive radio signals with a plurality of monitoring transceivers such as 8, 10 and 12 located along a roadway 14. Transceivers 8 and 10 are stationary, for example, fixed to telephone poles such as 16 and 18. The monitoring transceivers may additionally or alternatively may be mounted in police patrol cars, as shown by transceiver 12 in patrol car 20. The monitoring transceivers communicate with central processor means 22 via radio signals and/or conventional telephone lines 24 or the like. Central processor 22 is in communication with the motor vehicle department 26.

Each vehicle transceiver 6 includes means for entering driver identification such as social security number, driver's license number or the like, and for entering vehicle identification, such as automobile license plate number or the like. The vehicle transceiver sends radio signals indicative of vehicle speed, driver identification and vehicle identification. The monitoring transceivers receive this information, for reporting such information to the central processor 22, to be described. A run enable system is provided with the vehicle transceivers to prevent operation of the vehicle without entry of both the driver and vehicle identification. In preferred form, the stationary monitoring transceivers such as 8 and 10 send radio signals indicative of speed limit in their particular locale, and the vehicle transceivers such as 6 receive such speed indicative radio signals for comparison against vehicle speed, and reporting of a given relation, such as a violation, to central processor 22.

FIG. 2 is a schematic block level diagram of vehicle transceiver 6. Vehicle surveillance computer 30 is based on an Intel 8051 microprocessor system, described more fully in conjunction with FIG. 4. Computer 30 controls coordination of all peripherals and sends information to tamper system 32 regarding status and various activities. Key detector 34 verifies insertion of a key in the vehicle ignition system. Card reader 36 reads the social security number of the driver or like driver identification upon insertion of a magnetic tape card or the like. Driver interface 38 includes alpha numeric keyboard 40, alarm 42 and LCD display 44, FIG. 1a. Speedometer 46 may be the vehicle's own speedometer, or a dedicated magnetic or optical sensor preferably on a non-drive wheel. The latter would prevent a false speed reading in the event of loss of traction. Programming plug 48 allows programming of vehicle identification, such as license plate number. Plug 48 must be removed for vehicle operation. Programming is permitted only by official personnel, such as police, state officials, or perhaps an automobile dealer. Programmed data may optionally include social security numbers, driver's license numbers, or other identification of drivers authorized to operate the vehicle. As an alternative, a second plug may be used for entry of authorized driver identification, which second plug is programmable by the vehicle owner. A yet further option, is a single plug having a portion of its information accessible by the vehicle owner for entry of authorized driver identification numbers, and another portion accessible only by official personnel through special codes or like security for entry of vehicle identification. Nonvolatile memory 50, preferably an electrically erasable read only memory, is provided for storing and updating various data for security thereof in the event of power outage, such as removal of the vehicle battery. Directional antenna 52 and receiver 54 receive information at the sending frequency of the monitoring transceivers such as 8 and 10. Directional antenna 56 and transmitter 58 transmit information at the sending frequency of vehicle transceiver 6, which is the vehicle reply frequency. Two separate frequencies are used. A single antenna may be used if compatible. The standing wave ratio, which is the measure of the impedance match of the antenna to its environment and ideally is unity, is checked for proper system operation.

Tamper system 32 checks for proper functioning of vehicle surveillance computer 30 and records any tampering therewith. Additionally, radio signals may be transmitted indicative of vehicle identification and tampering. A tamper signal may be sent on the transmit frequency from an antenna 56 or may be sent on a separate dedicated tamper frequency from a separate dedicated antenna if appropriate. Tamper system 32 is a self-contained unit having its own battery back-up and responsive to disconnection of transceiver 6 to cause transmission of a tamper signal. Tamper system 32 may also respond to tampering with the transceiver to prevent vehicle operation by actuating run enable means such as the starter or run solenoid 60 and/or the engine control system 62 such as the fuel system, ignition system or engine computer. Serial status port 64 is provided for monitoring proper operation of vehicle surveillance computer 30. Timer bit port 66 is a watch dog timer port for ensuring that the vehicle surveillance computer is executing its program. Computer 30 requires a certain amount of time to execute its program, during which time the timer bit at 66 is on. Tamper system 32 watches this bit to make sure that it is on for a certain period of time and that it is off for a certain period of time. Nonvolatile memory 68 stores tamper data comparably to storage of vehicle and violation data by memory 50.

Referring to FIG. 3, the monitor transceivers such as 8 include a monitor surveillance computer 70 based on a microprocessor system such as an Intel 8051. In the case of a stationary monitor transceiver 8 fixed to a telephone pole or the like, programming plug 72 provides entry of the identification number of the pole, the pole type, calendering synchronization for date and time, speed limit, data phone number or the like, a timer limit for determining how often information is transmitted to cars for reply, and an alarm phone number, to be described. Nonvolatile memory 74 stores violation data until it can be transmitted to the authorities. In some applications, a vehicle detector 76, such as a magnetic, photo, air, radar or ultrasonic detector, may be mounted on the pole or in the roadway to alert monitor surveillance computer 70 that a vehicle has passed and a transmission should have been received from the vehicle. Receiver 78 has a directional antenna 80 and listens for vehicles on the vehicle sending frequency, which is the monitor receive frequency. Transmitter 82 has a directional antenna 84 and sends signals on the monitor transmit frequency, which is the vehicle receive frequency. Data transmitter 86 sends violation data to central processor 22 by phone lines, cable TV lines, radio frequencies or the like. Monitor transceiver 8 may also communicate with other monitor transceivers for example in partol cars, for quick action and/or apprehension.

Referring to FIG. 4, vehicle surveillance computer 30 is provided by an Intel 8051 microprocessor module. Port 0 is used for reading information from and writing information to nonvolatile memory 50 provided by an SY 2802 E electrically erasable read only memory, EEROM, having a 256 eight bit characters. Chip 30 has a built-in UART, universally asynchronous receiver transmitter, for sending data through transmit port 88 and for receiving data through receive port 90. Ports 88 and 90 are connected respectively to transmitter 58 and receiver 54. The interrupt port, INTO, is used to detect if data is being sent to monitor 8 from another vehicle, and is thus a carrier detect. Port 1 at the bottom of chip 30 is connected to the driver interface 38, to be described.

Port 2 of chip 30 has two pins 6 and 7 providing connection 64 to tamper system 32 for serial communication, to be described. Pin 5 of port 2 is connected to programming plug 48. Pins 1–4 of port 2 are connected to card reader 36. Pin 0 of port 2 is connected to key detector 34 using a uA 710 amplifier 92 for squaring the signal and providing a desired level thereof for the 8051 chip and for the tamper system at connection 94. Timer port TO of the chip is connected to speedometer 46 which is a pulse tachometer on the drive train or on a non-drive wheel for counting pulses therefrom. Another uA 710 amplifier 96 squares the pulses and provides a desired signal level to the Intel 8051 chip and to the tamper system 32 at connection 98.

FIG. 5 shows driver interface 38. The connections from port 1 of vehicle surveillance computer 30 are shown at the left. The data is sent to seven segment LCD displays **44*a* and 44*b* by pins 1–3 and is latched by binary coded decimal to seven segment latches 102 and 104 from pin 0 for the left digit and pin 0 through inverter 106 for the right digit. Displays 44*a* and 44*b* are on the dashboard at 44, FIG. 1. Keyboard 40 is strobed in by pins 1–3. If the keyboard is used for pre-authorization operating codes in addition to or as an alternative to card reader 36, the resulting key detection is via pins 4–7 stored in four bit latch 108, which lines are also multiplexed through programming plug 48** for entry of identification numbers.

Figure 6:
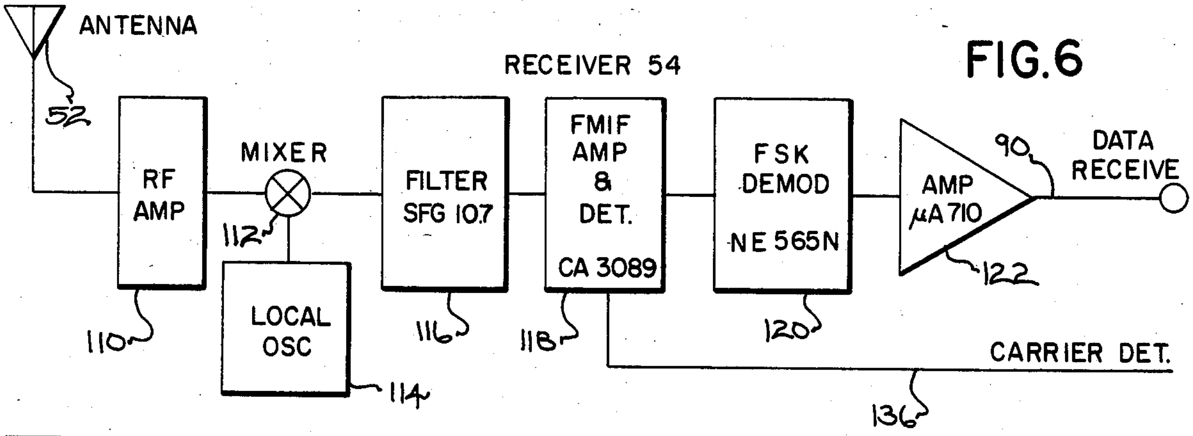
FIG. 6 is a schematic circuit diagram of the receiver of FIG. 2.

FIG. 6 shows vehicle receiver 54. Directional antenna 52 is fed to an RF radio frequency amplifier 110 whose output is mixed with a local oscillator frequency from local oscillator 114 in a heterodyning mixer 112 whose output is fed to an SFG 10.7 megahertz ceramic filter 116. The received signal is then fed to a CA 3089 FM IF, frequency modulated intermediate frequency, amplifier detector 118, and then to an NE 565 N FSK, frequency shift keyed, demodulator 120, and then through squaring uA 710 amplifier 122 to data receive port 90, FIG. 4.

Figure 7:
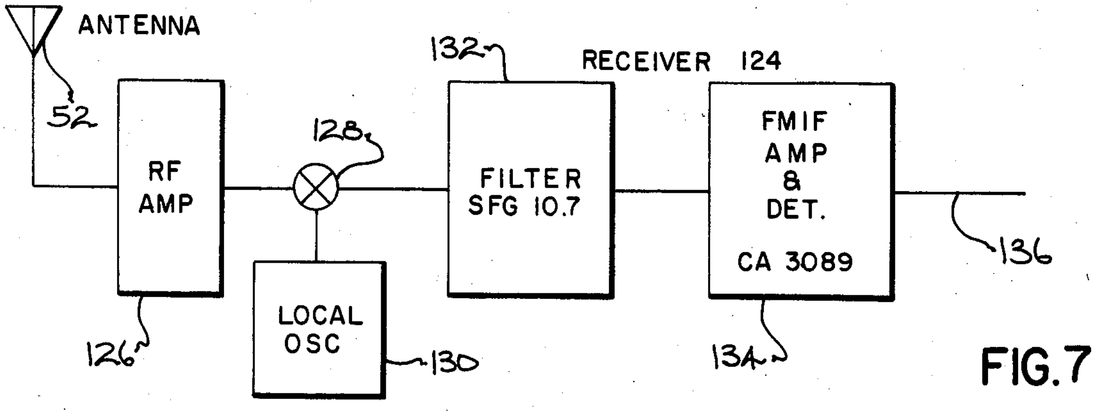
FIG. 7 is a schematic circuit diagram of the carrier detection vehicle reply frequency receiver of FIG. 4.

FIG. 7 shows a second receiver 124 for detecting whether or not other vehicles are transmitting. Receiver 124 may use directional receiving antenna 52 of the first receiver 54, or may have its own dedicated antenna since the frequencies are not the same. First receiver 54 receives signals on the vehicle receive frequency which is the monitor transmit frequency. Second receiver 124 receives signals on the vehicle transmit frequency, to detect whether or not other vehicles in the area are transmitting signals. If other vehicles are transmitting to the monitor, then the present vehicle waits until such transmissions are completed, and then begins its transmission, to be described. Referring to FIG. 7, receiver 124 is substantially similar to the left portion of FIG. 6. The antenna is fed to RF amplifier 126 whose output is mixed in heterodyne mixer 128 with a local oscillator frequency from a second local oscillator 130. The signal is then fed through SFG 10.7 megahertz ceramic filter 132 and CA 3089 FM IF, frequency modulated intermediate frequency, amplifier detector 134 and output on connection 136 to receiver 54, FIG. 6.

Figure 8:
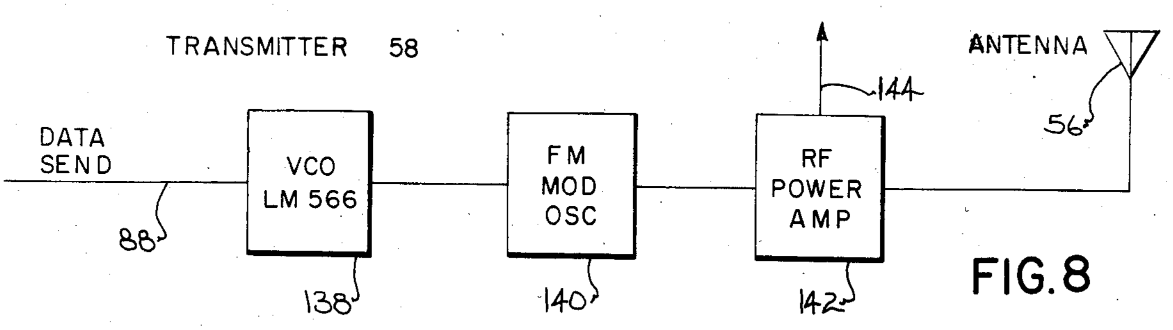
FIG. 8 is a schematic circuit diagram of the transmitter of FIG. 2.

FIG. 8 shows vehicle transmitter 58. Data send port 88 from vehicle surveillance computer 30, FIG. 4, is connected to an LM566 voltage controlled oscillator, VCO, 138 and then to an FM modulator oscillator 140 and RF power amplifier 142 to directional antenna 56. The standing wave ratio, SWR, signal on line 144 goes to tamper system 32 for determining the degree of antenna impedance match. In FIGS. 6–8, components 110, 112, 114, 126, 128, 130, 140 and 142 are selected based on transmit and receive frequencies.

Figure 9:
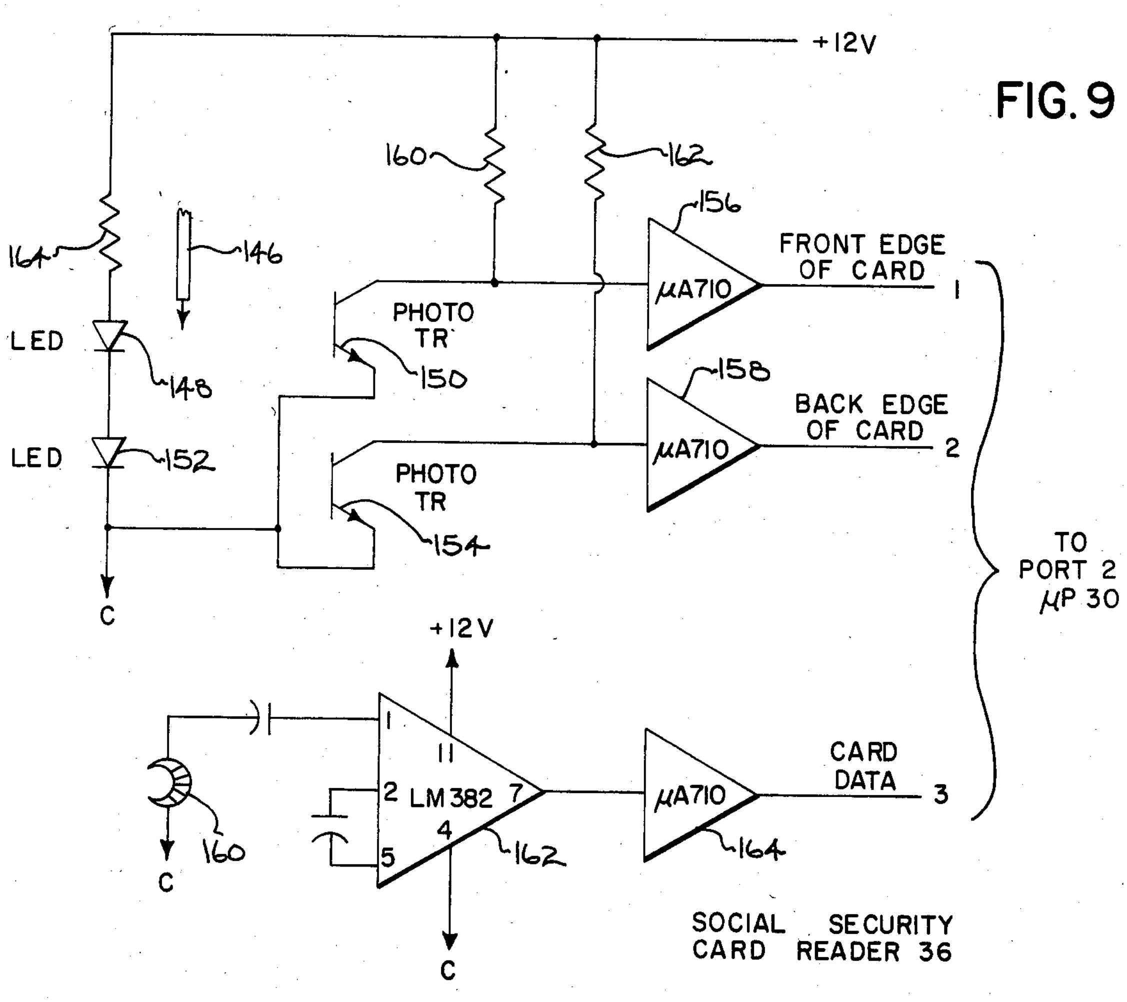
FIG. 9 is a schematic circuit diagram of the social security card reader of FIG. 2.

FIG. 9 shows social security card reader 36, FIGS. 1 and 2. Social security or other driver identification card 146 slides between light emitting diode 148 and phototransistor 150, and between light emitting diode 152 and phototransistor 154. Card 146 blocks the transmission of light from LED 148 to phototransistor 150 to turn the latter off such that the voltage level at its collector rises and provides a signal which is squared by uA 170 amplifier 156 and supplied to pin 1 of port 2 of vehicle computer 30, FIG. 4, which indicates that the front edge of the card has been inserted. The vehicle surveillance computer thus knows that a card is being inserted. Further insertion of the card causes it to block the transmission of light from LED 152 to phototransistor 154 to turn the latter off, such that its collector voltage rises and provides a signal squared through uA 710 amplifier 158 to pin 2 of port 2 of vehicle surveillance computer 30, indicating that the card is fully inserted. The collectors of transistors 150 and 154 and the anode of LED 148 are connected through respective voltage dropping resistors 160, 162 and 164 to a voltage source, such as a 12 volt battery of the vehicle. The emitters of transistors 150 and 154 and the cathode of LED 152 are connected to ground or a common reference point. The signal from amplifier 158, in addition to indicating full insertion of the card, also prevents operation of the vehicle if the card is pulled out while the system is running, as an added security feature. Card data detection is done with a magnetic tape head reader 160 through an LM382 tape head amplifier 162 whose output is squared by uA 710 amplifier 164 and supplied to pin 3 of port 2 of vehicle surveillance computer 30.

Figure 10:
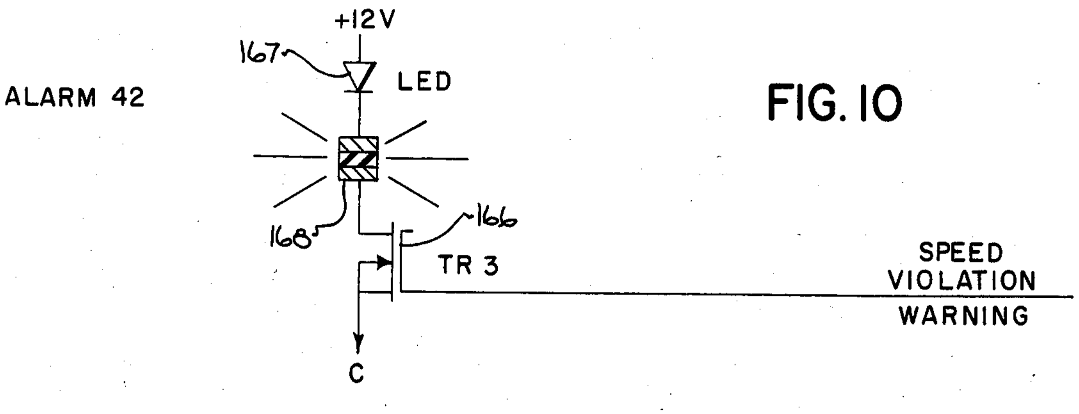
FIG. 10 is a schematic circuit diagram of the alarm 42 of FIG. 1.

FIG. 10 shows alarm 42. Pin 4 of port 2 of vehicle surveillance computer 30 controls conduction of field effect transistor 166 having its source connected to ground or a common reference potential and its drain connected to a voltage source such as a 12 volt battery of the vehicle through a visual and/or audio alarm such as LED 167 and/or piezoelectric beeper 168.

FIG. 11 shows the tamper system of FIG. 2. The tamper system is based on an Intel 8051 microprocessor 32 using an SY 2802E EEROM 68 for event storage. The speedometer connection 98 from FIGS. 2 and 4 is input to port TO. The watch dog timer, WDT, connection 66 from FIGS. 2 and 4 is input to timer T1. The key-in connection 94 from FIG. 4 is input to pin 0 of port 2. The standing wave ratio, SWR, connection 144 from FIGS. 2 and 8 is input to pin 1 of port 2. Pins 2 and 3 of port 2 of module 32 are connected to pins 6 and 7 of port 2 of module 30, providing connection 64 of FIG. 2. Pin 4 of port 2 is connected through resistor 170 to the switch contact 172 of the run solenoid 60 to enable a check to be made if the run enable signal has been turned on to supply voltage from a voltage source such as a 12 volt battery of the vehicle to the electrical circuitry of the engine at 174. Zener diode 176 clamps the voltage at pin 4 to 5 volts which is desired for module 32. When starter switch 178 is closed, power is enabled to the circuit of run solenoid 60 from the 12 volt supply if bipolar transistor 180 is turned on through resistor 182 and field effect transistor 184 from pin 5 of port 2. The RXD and TXD ports are connected to engine control system 62.

FIG. 12 shows the monitor surveillance computer of FIG. 3 and is based on an Intel 8051 microprocessor 70. Memory is provided by a 64K by eight bit random access memory 74 and on board back-up battery 75. Port 0 and port 2 are used for addressing the memory. WR and RD are write and read command ports, and ALE is the address latch enable port. The data transmit and receive ports TXD and RXD are connected to a selection circuit 188 controlled by port 3, pin 5, for determining whether data is to be transmitted to or received from a vehicle, or transmitted to or received from central processor 22. Selection circuitry 188 includes a plurality of AH 5009 anolog switches 190, 192, 194 and 196, and a 4004 inverter 198. With pin 5 of port 3 high, analog switch 196 is enabled such that data from transmit port TDX may be transmitted to central processor 22. The high signal from pin 5 of port 3 is inverted low by inverter 198 such that analog switch 190 is disabled and data from transmit port TDX cannot be transmitted to a vehicle. Conversely, when pin 5 of port 3 is low, analog switch 196 is disabled, and analog switch 190 is enabled such that data may be transmitted to a vehicle. The transmission circuitry is like that shown in FIG. 8, with the transmit frequency being the receive frequency of the vehicle. In the receiving mode, when pin 5 of port 3 is high, analog switch 192 is disabled, and analog switch 194 is enabled such that data from central processor 22 is received at receiving port RXD. Conversely, when pin 5 of port 3 is low, analog switch 194 is disabled, and analog switch 192 is enabled such that the monitor surveillance computer receives data at port RXD from the vehicle. The receiver circuitry is like that shown in FIG. 6 with the frequency selected to match the vehicle transmit frequency and the central processor transmit frequency. Alternatively, analog switches 194 and 196 may be connected to central processor 22 by an autodial modem via phone lines 24, or the like. Port 1 of module 70 is connected to programming plug 72. The INTO interrupt request line is connected to vehicle detector 76 through uA 710 squaring amplifier 202.

Figure 13:
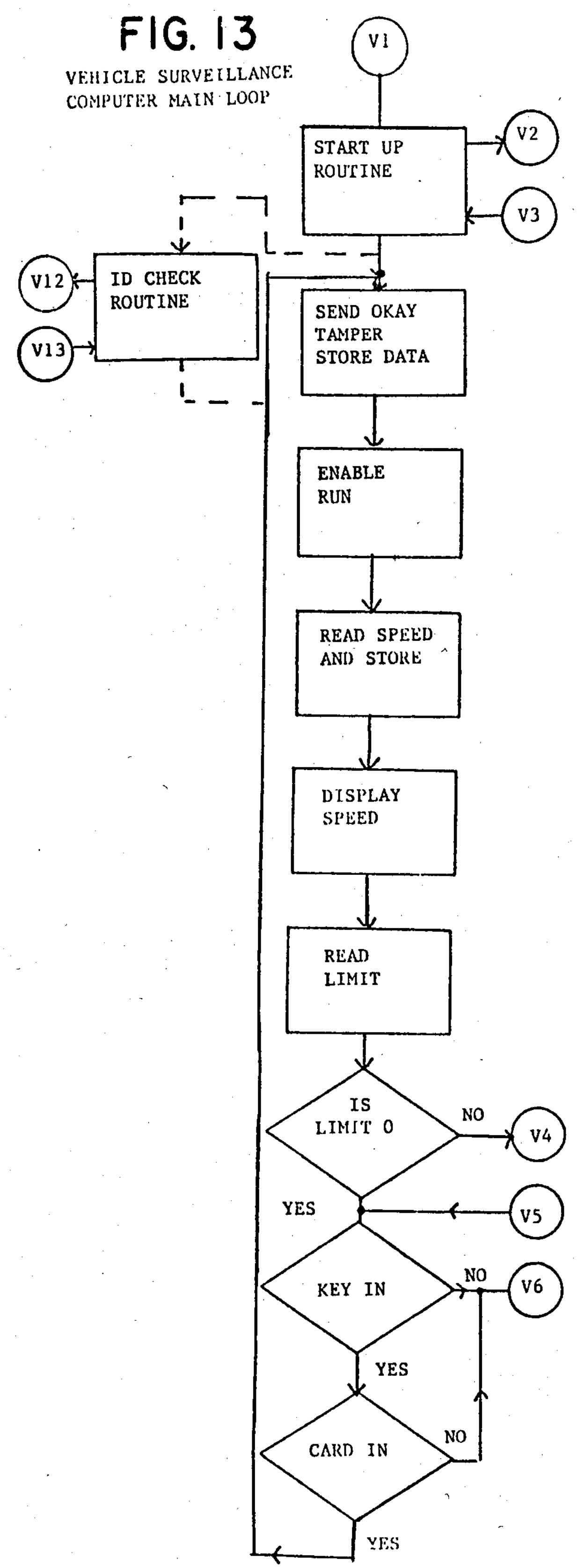
FIG. 13 is the vehicle surveillance computer main loop program flowchart.

FIG. 13 shows the main loop software routine of vehicle surveillance computer 30. The start-up routine starts when the key is inserted, exiting at V2 and returning at V4, to be described, FIG. 14, and checks and reads the social security number, plus other things, to be described. As shown in dashed line, there may be an optional ID check routine for checking a customized authorization number to be entered via keyboard 40. An okay is sent to tamper system 32 to indicated that the system is functional, and then the run circuit is enabled via serial status port 64 to the tamper system. Speed is then read from speedometer or pulse tachometer 46 and stored, and then displayed on displays 44*a* and 44*b*. If a speed limit signal has been received from monitor transceiver 8 and monitor surveillance computer 70, that limit is read. If the limit is 0, then a check is made to see if the key and card 146 are in, and if so the routine returns. If the speed limit is not 0, this implies that monitor transceiver 8 has transmitted a speed limit to the vehicle. A check is then made for violation at routine V4, to be described, FIG. 18, and returns at V6 and checks whether the key is in. If the key is not in or if the card is not in, the routine goes to the V6 stop routine, to be described, FIG. 19.

Figure 14:
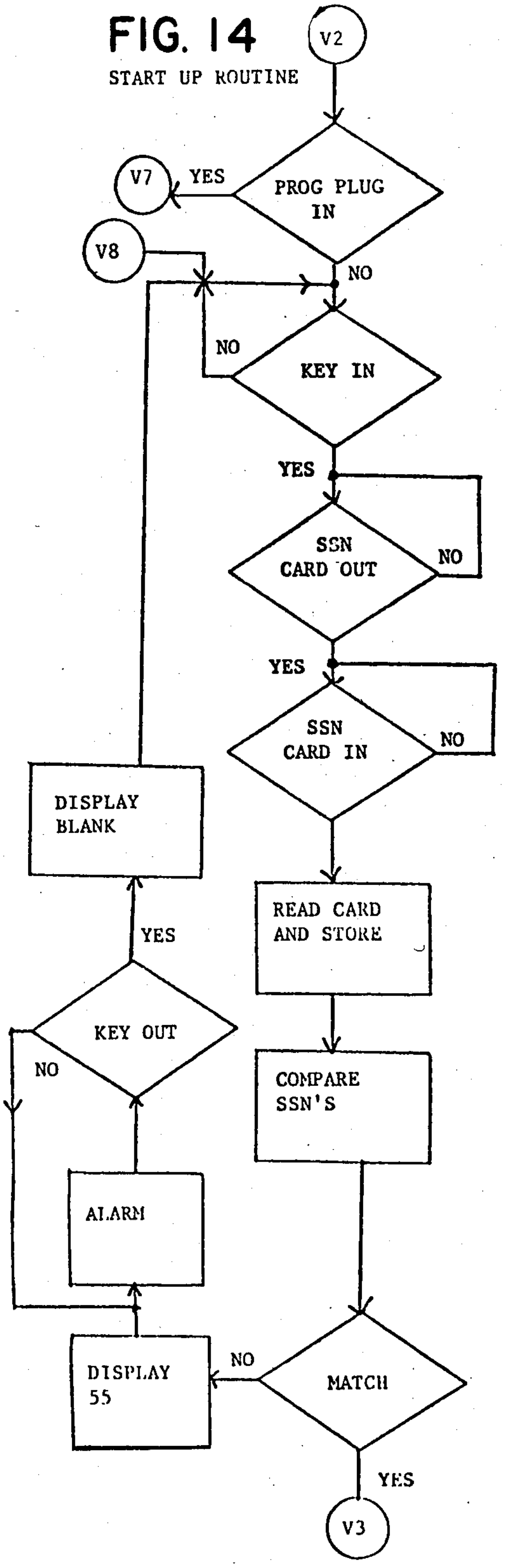
FIG. 14 is the vehicle start-up routine.

FIG. 14 shows the vehicle computer start-up routine. At entry V2 a check is made to see if programming plug 48 is in. If so, then the routine goes to the V7 programming routine, to be described, FIG. 15. The return from the programming routine is at V8. If the programming plug is not in, then a check is made to see if the key is in, and if not the loop returns and stays at that point. If the key is in, then a check is made to see if social security card 46 is out, and if not the loop returns and stays at the same point. This is a definite sequence that must be gone through to make sure that the card is read as it is moving in. This further verifies that the key is put in first, with the card out, and that the card is then inserted and read as it is moving in. If the social security card is out after the key is inserted, then the routine continues and now checks to see if the social security card is in, and if not the loop returns and stays at the same point until the card is inserted. In this sequence then, the system knows that the key is inserted first, with the card out, followed by insertion of the card. This or another given prescribed chronological sequence of events may be desirable in certain applications.

If the front edge of card 146 is in, as determined by phototransistor 150 and pin 1 of port 2 of computer 30, the card is read as it is moving in and the data is stored. The data is compared against the stored list of social security numbers or other driver identification numbers authorized to operate the vehicle. If a match is found, the routine exits at V3. If there is no match, something unusual is displayed on displays 44*a* and 44*b* as an alert, and alarm 42, provided by light 167 and/or beeper 168, is activated to provide a warning. A check is then made to make sure the key is taken out, and if not the loop returns to activate the alarm. If the key is taken out, displays 44*a* and 44*b* are blanked and the routine returns to enable the loop to again start checking for key in, social security card and so forth. As an option, the ID number of the unauthorized card may be stored for later checking and apprehension.

Figure 15:
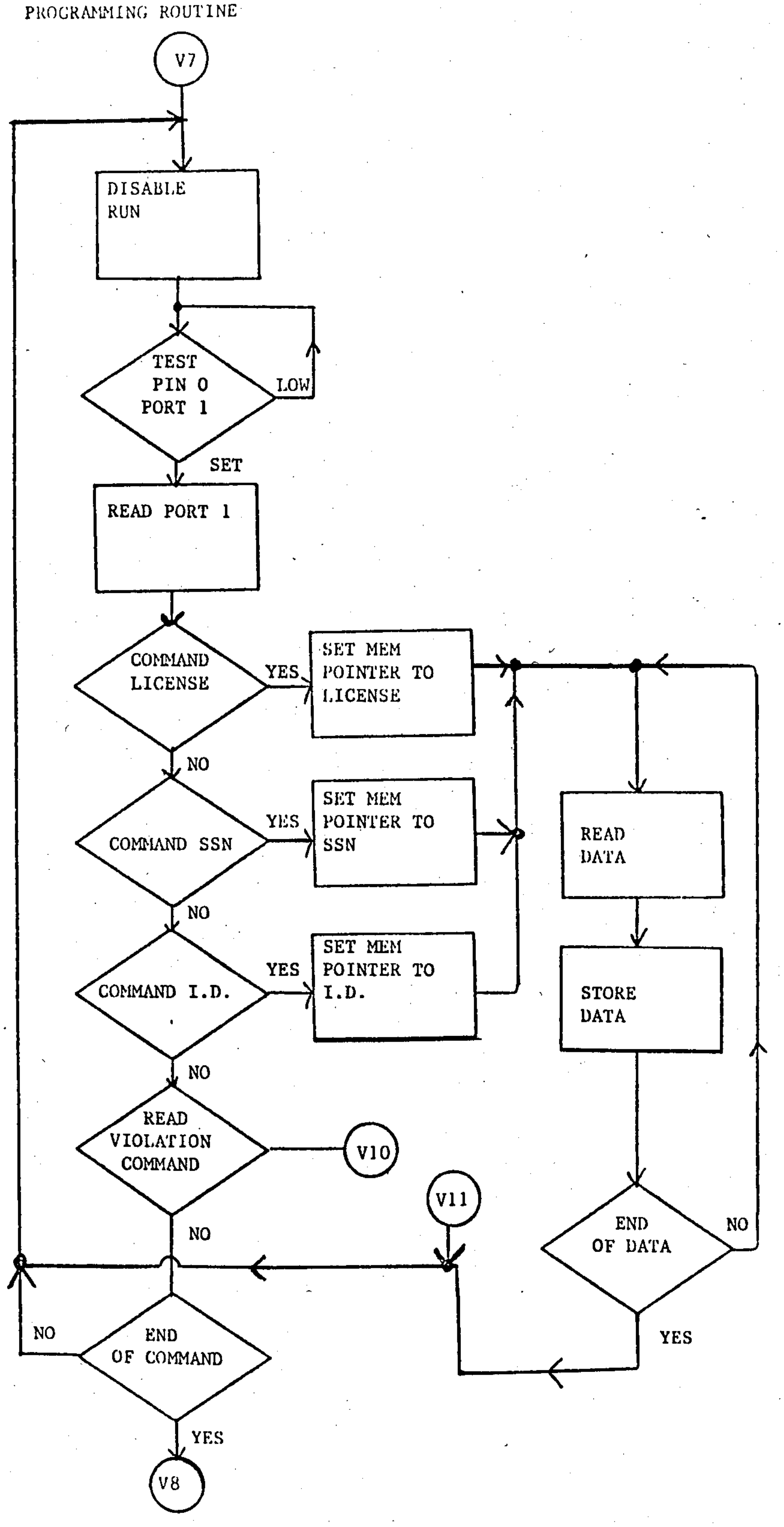
FIG. 15 is the vehicle programming routine via plug 48.

FIG. 15 shows the progamming routine for vehicle computer 30. V7 is entered from FIG. 14. The programming routine allows the authorities, such as law enforcement personnel, the motor vehicle department, and so on, to program various parameters into vehicle surveillance computer 30. A disable run signal is sent to the tamper system which in turn prevents operation of the vehicle during programming. Next, pin 0 of port 1 of computer 30 is tested to make sure that the progamming computer is sending a bit to computer 30, and if not the loop returns. If there is a high signal on pin 0 of port 1 of computer 30, then it is set, and port 1 is read. The first command is whether to change or enter a vehicle license number; another command is whether to change or enter additional social security numbers; another command is whether to alter or add other identification numbers. If any of these commands are to be performed, then the pointer in memory 50 is set to the respective license or social security or other ID storage address, and the data is read and stored until completed. If end of the data is completed, then the loop returns to the V7 entry to continue programming. If there are no commands for license, social security or other ID, in the first or any subsequent cycles through the loop completing data entry, then a check is made to determine if there is a violation command. If so, the routine goes to the read violation routine V10, to be described, FIG. 16. The return from the read violation routine is at V11. If there is no violation command, then a check is made to see if the command has ended, and if so the routine exits at V8. If not, the loop returns to V7.

Figure 16:
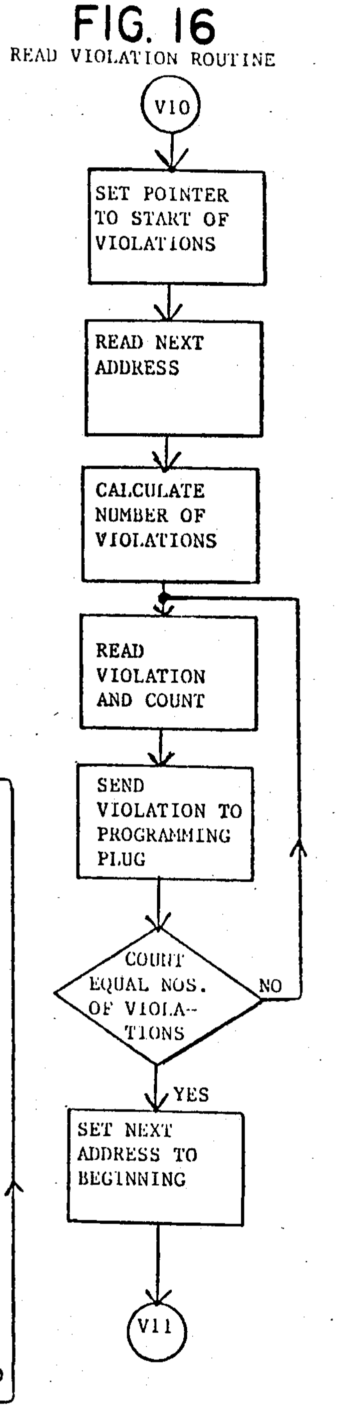
FIG. 16 is the vehicle read violation routine.

FIG. 16 shows the read violation routine, entering at V10 and exiting at V11. The memory pointer is set to the start of the violations where stored in memory 50. The next open address without a violation is then read, and the number of violations determined. The violations are read and counted, and sent to the programming plug. If the number of violations counted does not equal the number of violations read, then the loop returns. If the number of violations counted equals the number read, then the next address is set to the beginning so that subsequent violations will write over existing violations, to maximize memory usage and minimize the need for clearing erasure.

Figure 17:
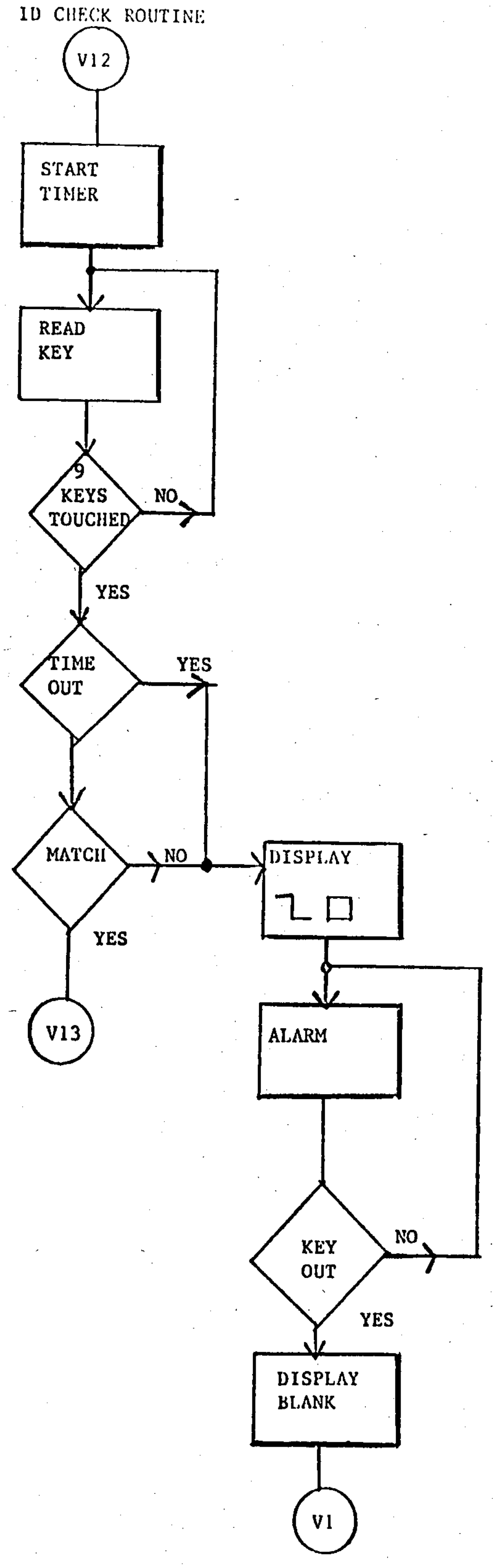
FIG. 17 is the vehicle ID check routine.

FIG. 17 shows the ID check routine of FIG. 13, entering at V12 and exiting at V13. This routine checks whether the driver has entered a custom ID number via keyboard 40, and may have various uses, including sobriety testing. A timer is started for providing a given length of time within which to enter a code. The keys are then read and if a given number, such as 9 keys, are not depressed, the loop returns. If the given number of keys are depressed, then a determination is made of whether the timer has timed out, and if so something unusual is displayed on displays 44*a* and 44*b*, and alarm 42 is actuated. If the key is not taken out, the loop returns and the alarm continues to be actuated. If the key is taken out, the display is blanked and the system returns to V1. If the timer has not timed out, then a check is made to see if the entered code matches the authorized code, and if not the unusual display and alarm sequence is repeated. If there is a match, the routine exits at V13.

Figure 18:
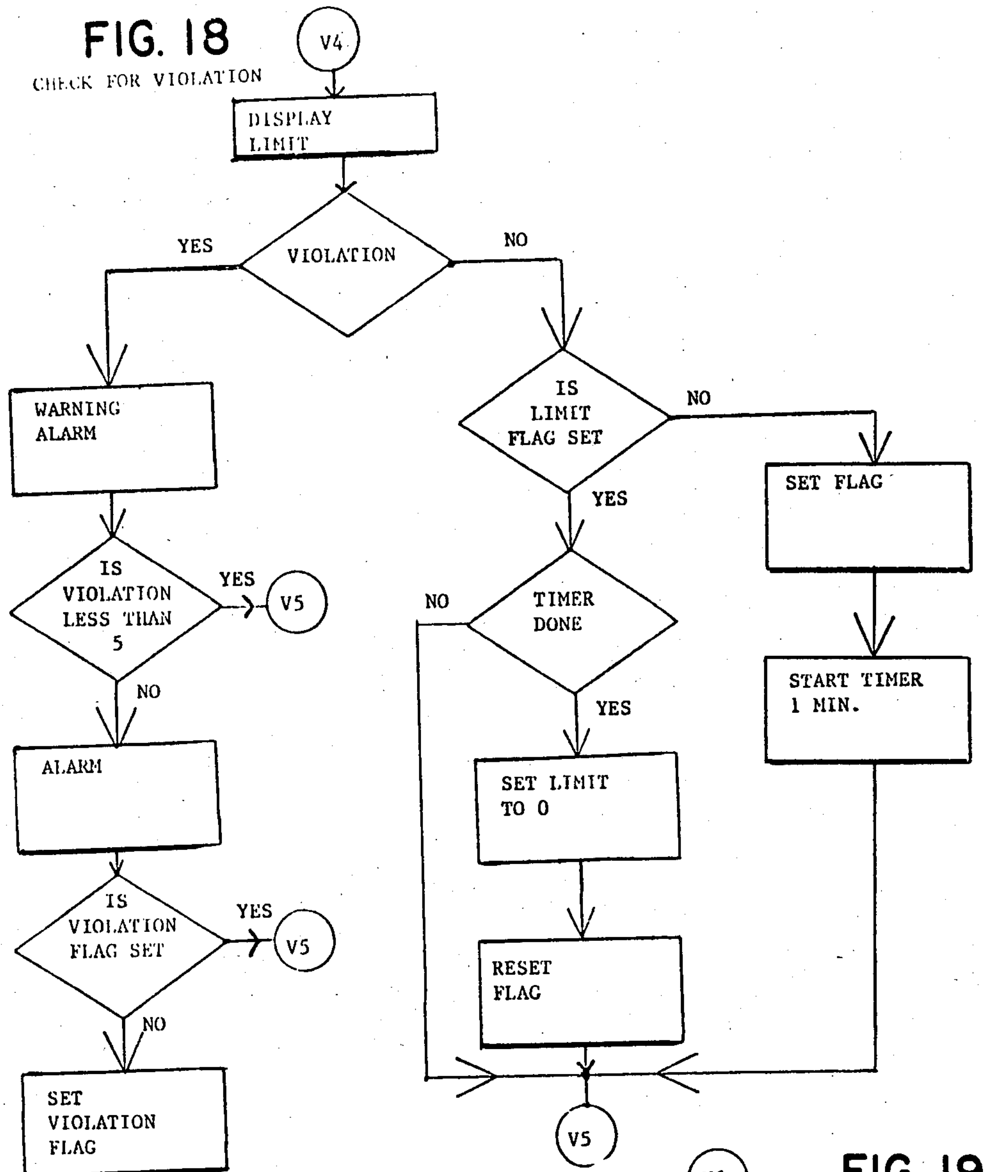
FIG. 18 is the vehicle check for violation routine.

FIG. 18 shows the check for violation routine of FIG. 13, entering at V4 and exiting at V5. The speed limit received from monitor transceiver 8 is displayed, and a check is made for violation. If there is no violation, a check is made to determine whether the limit flag is set. If not, then the flag is set and a one minute timer is started to provide a delay before returning at V5 so that the system will not enter further information during the given delay, or for example before reaching the next pole-mounted transceiver. The system will not try to get any further information from the pole transceiver during the given delay. This prevents the vehicle transceiver 6 from continually trying to respond to the pole transceiver. The delay would vary according to speed limit and locale. If the flag is set and the timer is done, the limit is set to 0, noting the test in FIG. 13 as to whether the limit is 0. The flag is then reset and the routine exits at V5. If the timer is not done, the routine goes directly to V5 without resetting the flag.

If there is a violation based on the speed limit received from the monitor transceiver, the driver is alerted with a short signal from alarm 42. If the violation is less than 5 miles per hour over the limit, or another given amount, the loop exits at V5. If the violation is greater than 5 miles per hour over the limit, alarm 42 is actuated continuously or in a certain pattern, not just momentarily. If the violation flag is set, the loop exits at V5. Thus, if a violation is detected at the beginning of the sequence, the system will not keep storing the same violation and fill up memory. If the violation flag is not set, the next step is to set the flag and then read the next address where violation data is to be stored in memory 50, and then store the violation data, and then update and store the next new address where the next violation data should be stored, followed by return at V5.

Figure 19:
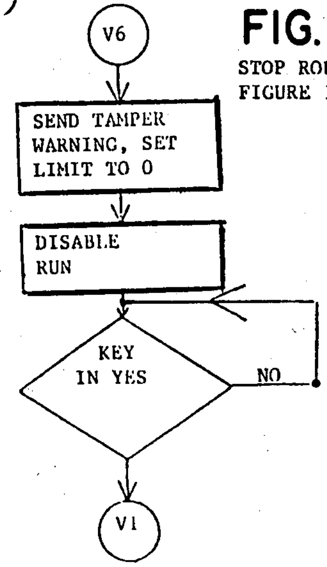
FIG. 19 is the vehicle stop routine.

FIG. 19 shows the stop routine from FIG. 13, entering at V6 and exiting at V1. A warning is sent to tamper system 32 indicating the stopping, and setting the speed limit to zero, followed by a disable run signal to solenoid 60. A check is then made to determine whether the key is in, and if not the loop returns and stays at the same point. If the key is in, then the routine goes to V1.

Figure 20:
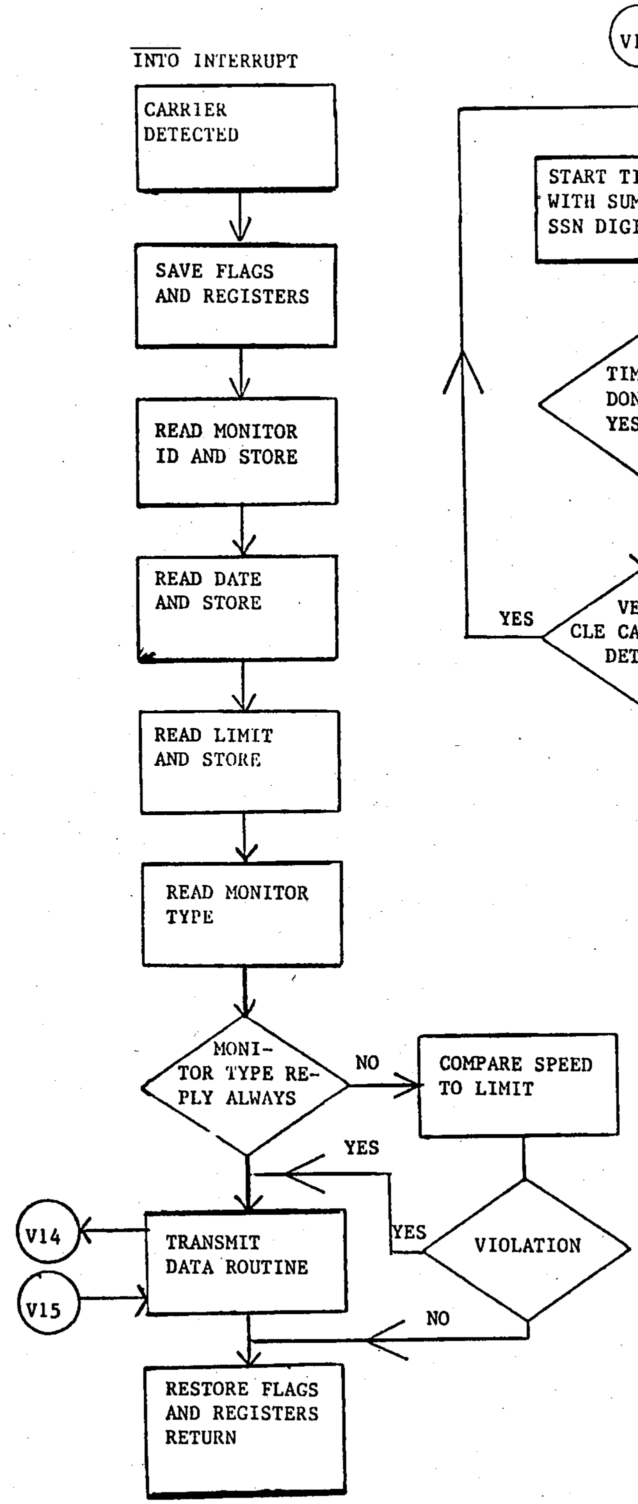
FIG. 20 is the vehicle violation reply interrupt routine.

FIG. 20 shows a violation reply interrupt routine. This routine is not in the main flow of the program. It can occur at any point in the program because it is based on an interrupt. When a carrier signal from a monitor transceiver such as 8 is detected at receiver 54, FIG. 6, and supplied on connection 136 to the INTO interrupt of vehicle surveillance computer 30, FIG. 4, the routine is initiated. All flags and registers are saved, to enable the program to be resumed when the interrupt routine is completed. The monitor transceiver identification number is read and stored, the date is read and stored, the speed limit is read and stored, and the monitor type is read. There are two types of monitor transceivers, the stationary or pole mounted type such as 8 and 10, and the mobile type such as 12 in a patrol car. The mobile monitor transceiver 12 is usually a reply always type, and the stationary monitor transceiver 8 is usually a reply on violation type. With the reply always type monitor transceiver, a patrol car may know the speed of a vehicle regardless of whether the vehicle is above the speed limit. The stationary pole type monitor transceiver knows the speed of the vehicle only if the vehicle is a certain amount above the speed limit. If the monitor transceiver is not a reply always type, i.e., is a stationary pole type transceiver 8, then the speed of the vehicle is compared with the speed limit, and if there is no violation the flags and registers are restored and the interrupt routine ends and the vehicle surveillance computer 30 returns to its program. If there is a violation, a transmit data routine is entered, V14 to be described, FIG. 21. If the monitor transceiver is the reply always type, then the transmit data routine is entered.

Figure 21:
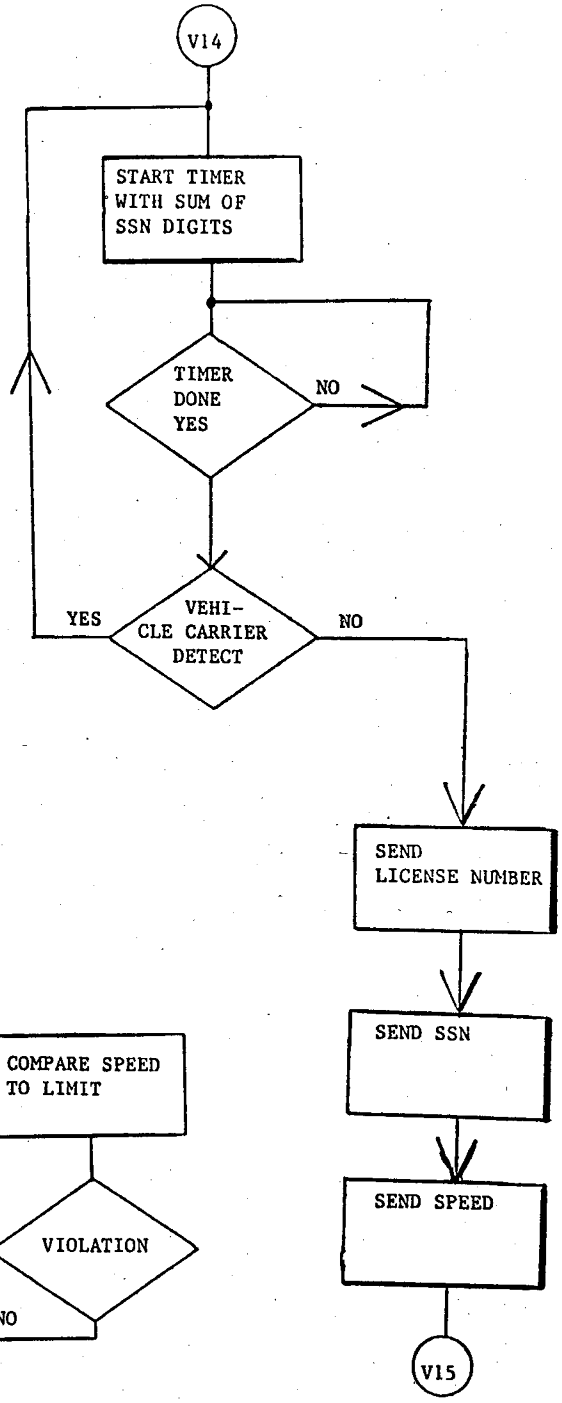
FIG. 21 is the vehicle transmit data routine.

FIG. 21 shows the transmit data routine of FIG. 20, entering at V14 and exiting at V15. A timer is started having a timed interval determined by the sum of the social secruity number digits. The probability of two social security numbers having the same sum of digits is three in ten thousand, and thus it is highly unlikely that more than one vehicle in the same locale of a monitor transceiver will have the same delay before responding to that monitor transceiver. When the timer is done, a check is made to determine if a vehicle transmit carrier frequency is detected at receiver 124, FIG. 7 and connection 136, FIG. 4, and if so the loop returns to V14 to start again. This means that another vehicle is responding to the monitor transceiver. After completion of a second timing interval, another vehicle transmission is again listened for, and if there is another vehicle responding the loop again repeats. This prevents two vehicles from responding to the monitor transceiver at the same time, which in turn prevents garbled transmissions. In view of the above noted low probability factor, it is unlikely that two vehicles will time out their delay at the same instant. If no other vehicle transmit carrier signal is detected, then there are no other vehicles in the area, or all the other vehicles have completed their transmission to the monitor transceiver, or the social security number determined delay of the present vehicle is shorter than the social security number determined delay of the remaining vehicles waiting to transmit to the monitor transceiver. Thus, when no other vehicle transmission carrier is detected, there is clear air space and it is the present vehicle's turn to transmit. The vehicle license number, social security number and speed is transmitted, and the routine exits at V15.

Figure 22:
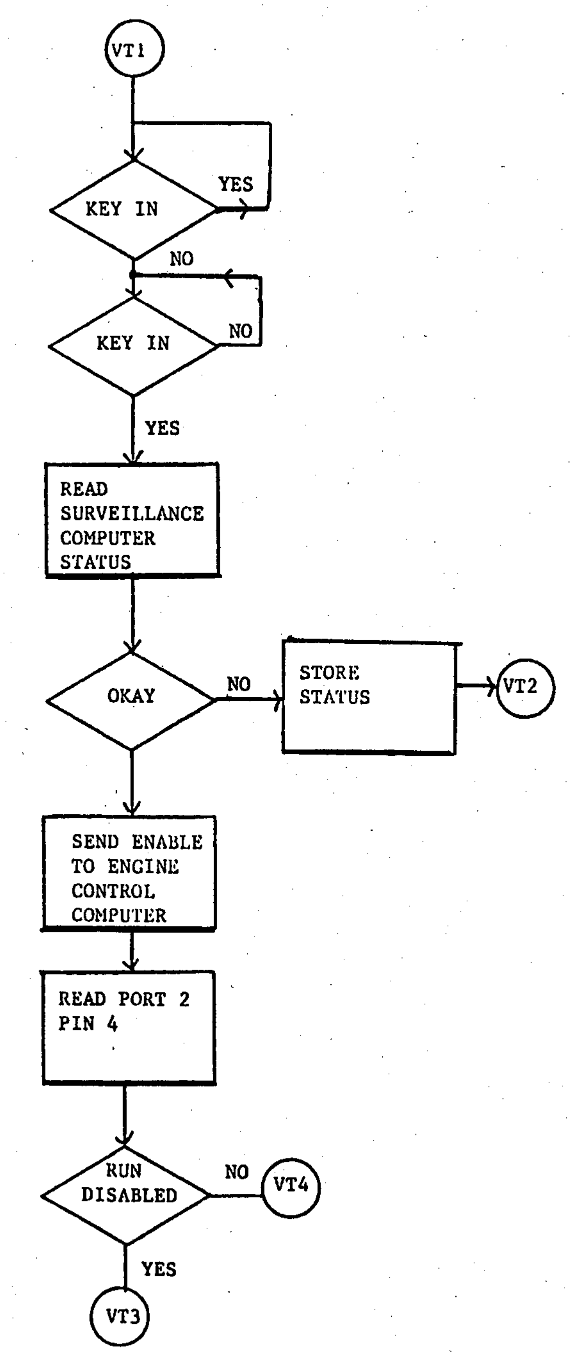
FIGS. 22–24 are the vehicle tamper computer routine.
Figure 23:
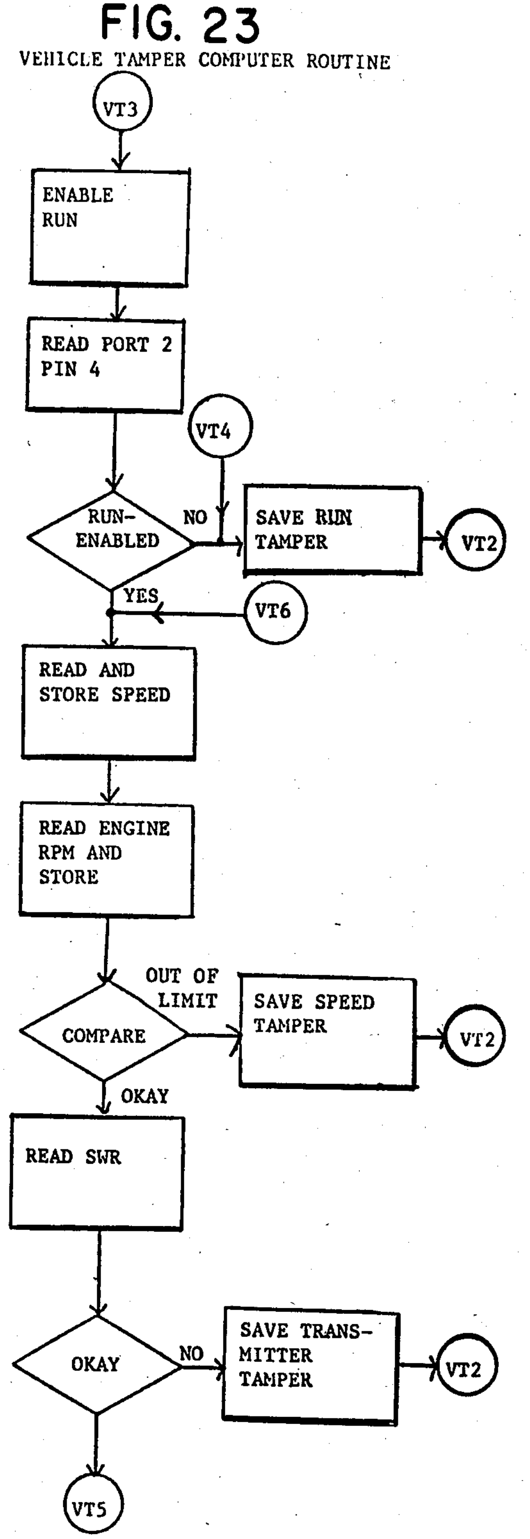
Figure 24:
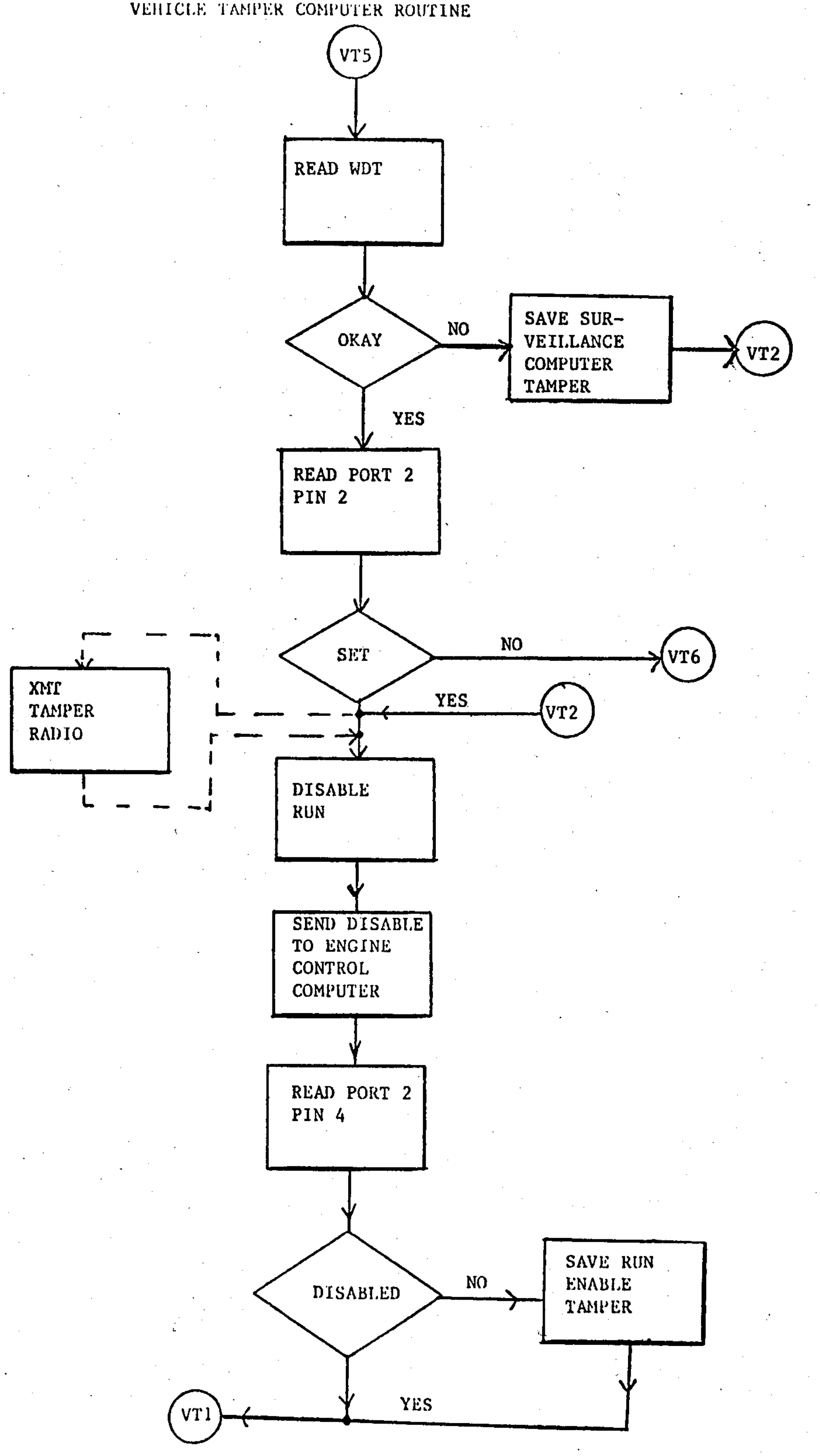

FIGS. 22-24 show the routine for vehicle tamper computer 32. An initial check is made as to whether the key is in, and if so the loop returns to VT1 and stays at the same point until the key is removed. When it is determined that the key is out, then a further check is made to determine if the key has been inserted, and if not the loop returns and stays at the same point. If the key is in, the loop continues. This definite sequence ensures that the key is intially out and then is inserted. The status of vehicle surveillance computer 30 is then read and if it is not okay, the status is stored and the loop continues at VT2, FIG. 24. If the status is okay, and an enable signal is sent to the engine control computer 62. Pin 4 of port 2 of tamper computer 32 is read, and if the run is not disabled the loop continues at VT4, FIG. 23, and if the run is disabled the loop continues at VT3, FIG. 23.

Continuing at VT3 in FIG. 23, the run is enabled, which actuates pin 5 of port 2 to go high which turns on FET 184 which turns on bipolar transistor 180 which turns on run solenoid 60. Pin 4 of port 2 of computer 32 is again read, and if the run is not enabled, i.e., is not high, then someone has tampered with the circuit, and the run tamper signal is saved and the loop continues at VT2. If the run is enabled, the speed is read and stored, and the engine RPM and gear is read and stored. These are compared, and if they are out of limit relative to each other, someone has tampered with the speedometer or the like, and a speed tamper signal is stored and the loop continues at VT2. If the comparison is okay, the standing wave ratio is read, and if that is okay the loop continues at VT5, FIG. 24. If the standing wave ratio is not okay, then someone has tampered with the transmitter, and a transmitter tamper signal is saved and the loop continues at VT2.

Continuing at VT5 in FIG. 24, the watch dog timer at port 66 is read, and if it is not okay someone has tampered with vehicle surveillance computer 30, and a tamper signal is saved and the loop continues at VT2. If the watch dog timer check is okay, pin 2 of port 2 of tamper computer 32 is read for serial status port update to determine if velocity surveillance computer 30 wants to talk to tamper computer 32. If not, i.e, if the bit is not set, the loop continues at VT6, FIG. 23. If the bit is set, indicating that vehicle surveillance computer 30 wants to talk to tamper computer 32, then the run is disabled and a disable signal is sent to the engine control computer 62. Pin 4 of port 2 of tamper computer 32 is read and if it is disabled the loop returns to the beginning at VT1. If not disabled, there has been tampering with the run enable circuit, and a run enable tamper signal is stored and the loop returns to VT1.

In FIGS. 22-24, VT2 in the loop is a sign of a tamper. In FIG. 24, a radio signal may be transmitted responsive to VT2 indicating the tamper. This transmit tamper radio signal may be sent out on a dedicated transmitter circuit and antenna like that shown in FIG. 8 and having its own dedicated frequency, or a separate frequency may be used with the same antenna 56.

FIG. 25 shows the main loop software routine of monitor surveillance computer 70 of monitor transceiver 8. If programming plug 72 is in, the loop goes to the monitor programming routine, entering at M2 and returning at M3, FIG. 28. If programming plug 72 is not in, the pole or monitor identification numbers, the date, the speed limit, and the monitor type are transmitted. A timer is then started and a check is made to see if data is received. If not, and if the timer is not done, the loop returns to again check on the reception of any data. If data is received, it is read, the speed compared to the limit, and the vehicle data is stored. The vehicle count is then decremented and the loop returns to check if the timer is done. If the timer is done, the vehicle count is checked. If the vehicle count is not zero, an alarm is sent and the count cleared, and the loop returns to check if it is time to send data to central processor 22. If so, the transmission path is selected, such as phone lines 24 or a radio frequency, and the data is sent. Each pole computer has an assigned time for sending its data to central processor 22. This additionally allows central processor 22 to know that the pole transceiver is working. Alternatively, the time for sending data may be determined by memory capacity. If the data has been send, or if it is not yet time to send the data, the loop returns to again transmit the monitor ID and so forth.

FIG. 26 shows the time of day interrupt routine. This routine can occur any time in the program. The time of day register is incremented at a predetermined counted number of clock cycles, according to the accuracy or resolution of time reporting desired. The register will overflow at midnight. If it is not midnight, the loop continues. If it is midnight, the time of day register is cleared and the loop returns and continues. This provides a calendar routine.

FIG. 27 shows the vehicle counter interrupt routine which can occur any time in the program. Whenever a vehicle is detected from detector 76 at INTO port of monitor computer 70, the vehicle counter register is incremented and the loop returns. This routine keeps count of the number of vehicles passing a pole type monitor transceiver that has a vehicle detector 76. As each vehicle replies, this count is decremented. If all systems are functioning, this count is zero; if not, improper operation is detected by a non-zero count, and the authorities can be alerted.

Figure 28:
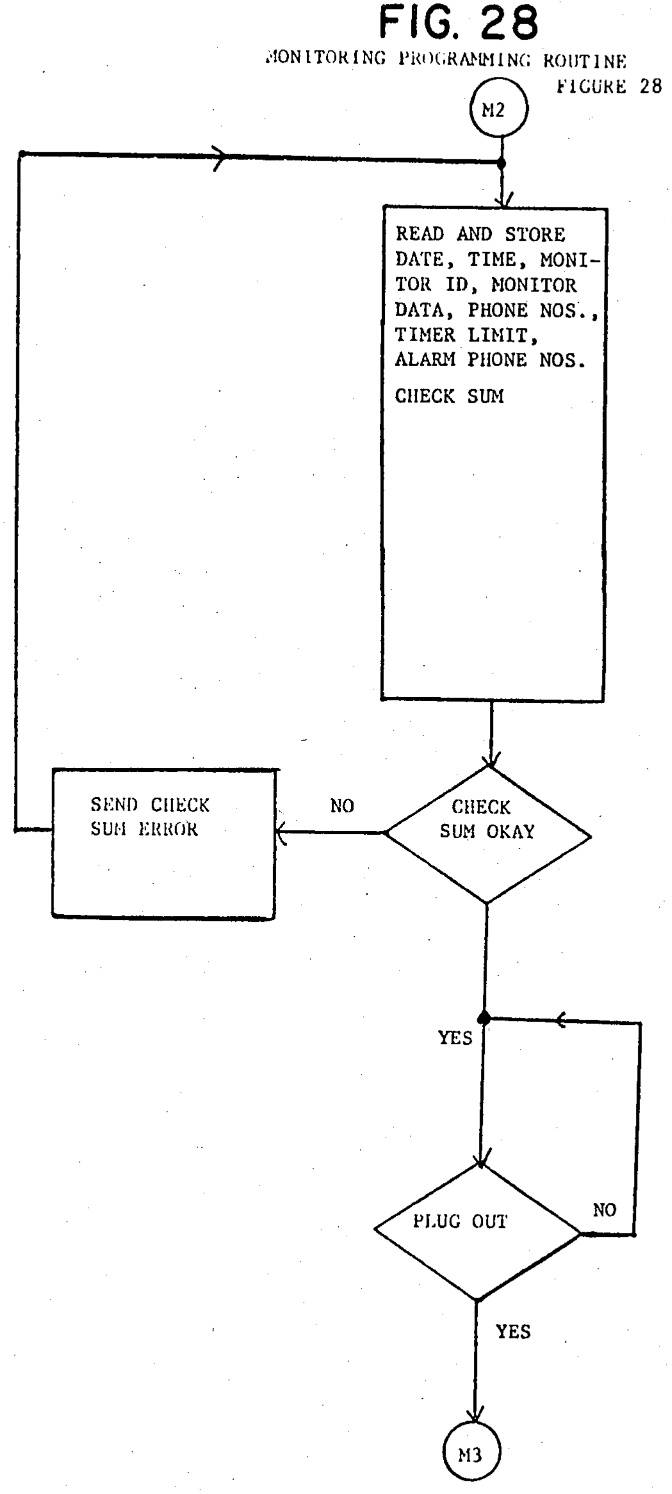
FIG. 28 is the monitor programming routine via plug 72.

FIG. 28 shows the monitor programming routine of FIG. 25. Entering at M2, the date, time, monitor ID, monitor type, reply always such as in a patrol car or reply only when there is a violation, such as a pole type, data phone numbers or the like for transmission over phone lines 24, or radio frequencies, the timer limit from FIG. 25, alarm phone numbers or radio frequencies when a detected vehicle has not responded to a pole for providing a separate fast access number to the central processor 22 or in an emergency, and so on, are read and stored. The sum of all the entering data digits is then checked as a safeguard against errors in storing the data. If the sum is not okay, a check sum error signal is sent and the loop returns to start over. If the sum is okay, a check is made to determine if programming plug 72 is out, and if not the loop returns and stays at the same point. If the plug is out, the loop exits at M3.

Figure 29:
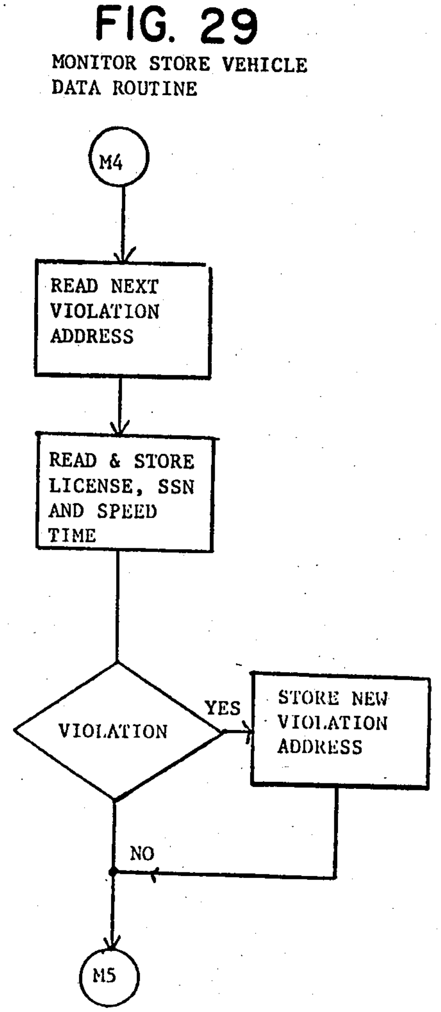
FIG. 29 is the monitor store vehicle data routine.

FIG. 29 shows the monitor store vehicle data routine of FIG. 25, entering at M4 and returning at M5. The next violation addresss is read, and the vehicle license number, social security number or other driver identification number, speed and time are read and stored. If there is a violation, a new violation address is stored and the next set of vehicle data will thus be stored in a new address. If there is no violation, the loop exits at M5 and the next set of vehicle data is merely written over the previous nonviolating vehicle data, because the memory address was not incremented.

Figure 30:
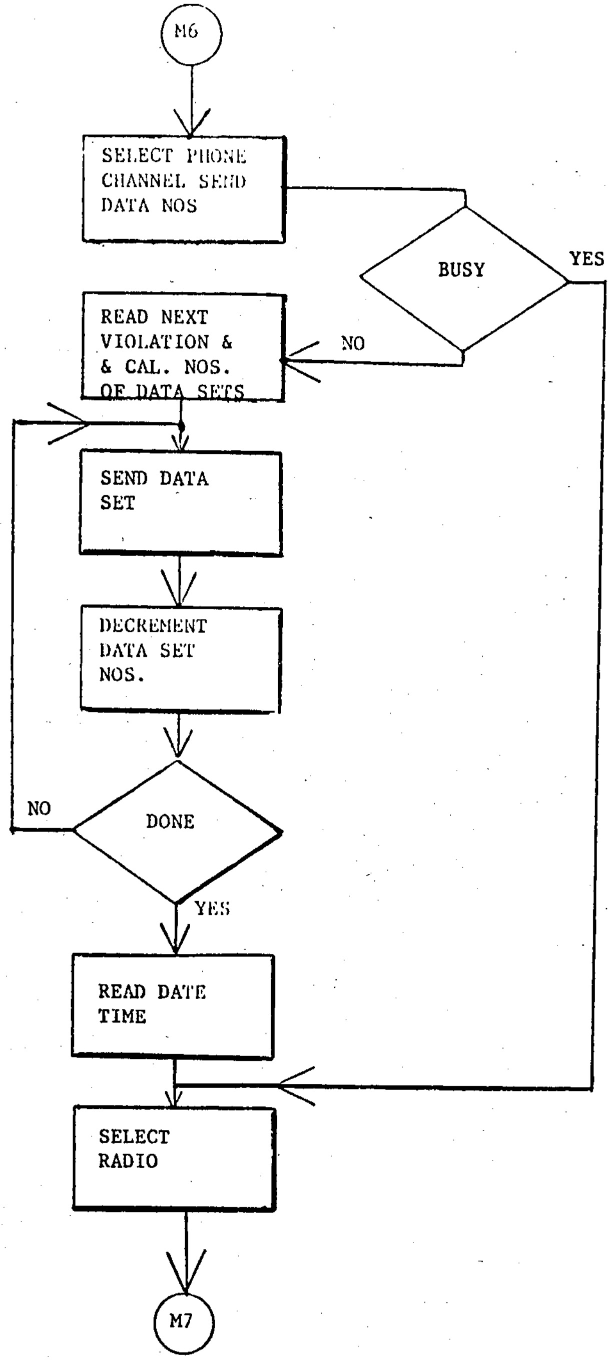
FIG. 30 is the monitor send data routine.

FIG. 30 shows the monitor send data routine of FIG. 25, entering at M6 and returning at M7. This routine sends data to central processor 22. The phone channel on lines 24 is selected and the phone data numbers are sent to an auto-dial modem or the like. If busy, the loop reverts to its normal operating mode by selecting radio signal transmission and exiting at M7 to return in FIG. 25 to its monitoring function by transmitting its ID number, speed limit and so forth. If the designated phone number is not busy, the next violation address is read and the number of data bits calculated, the data sent and the number of data bits decremented. If not done, the loop returns and continues again. When completed, the date, time and so forth is updated, radio transmission is selected, and the loop exits at M7 including setting a new data time send for FIG. 25. This enables central processor 22 to adaptably control the time of sending data based on rush hour traffic and so forth. In an alternative, memory paging may be used wherein a portion of the memory is being read out to central processor 22 while another portion of memory is being read into with vehicle data.

Figure 31:
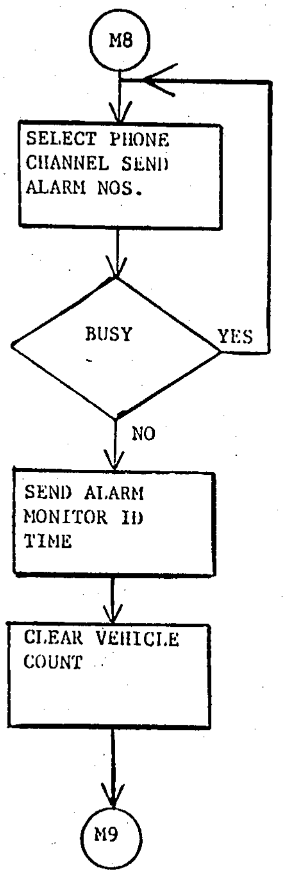
FIG. 31 is the monitor send alarm routine.

FIG. 31 shows the monitor send alarm routine of FIG. 25, entering at M8 and returning at M9. This routine is entered if a number of vehicles have not replied to a reply always type pole monitor that has a vehicle detector 76. It sends an alarm to alert the authorities of surveillance computer system malfunctions. The phone channel is selected and the alarm code or numbers sent to an auto-dial modem or the like. If busy, the loop returns and tries again. If the phone channel is not busy, the alarm, monitor or pole ID, and time is sent. The vehicle account is then cleared to prevent continued violation as read by a plurality of pole transceivers from being read as a single violation, but rather as a new violation for each pole or monitor transceiver detection.

It is recognized that various modifications are possible within the scope of the appended claims.

I claim:

1. A traffic speed surveillance system comprising:

vehicle transmitter means mounted in a vehicle and responsive to speedometer means for sending radio signals indicative of vehicle speed; and monitor receiver means located along a roadway and communicating with central processor means, and receiving said radio signals for surveillance of traffic speed, wherein:

said vehicle transmitter means includes means for entering driver indentification and for entering vehicle identification, and transmitting radio signals indicative thereof;

said monitor receiver means receives said radio signals indicative of speed, driver identification and vehicle identification, for reporting such information to said central processor means; and said vehicle transmitter means comprises run enable means operatively connected with said vehicle and disabling operation thereof without both said driver and said vehicle identification entry.

2. A traffic speed surveillance system comprising:

a set of monitor transceivers located along a roadway and communicating with a central processor, and including at least some stationary transceivers sending radio signals indicative of speed limit in the location of the particular stationary transceiver;

a vehicle transceiver mounted in a vehicle and including:

a vehicle receiver for receiving said radio signals indicative of speed limit;

means for entering driver identification and for entering vehicle identification;

speedometer means for measuring the speed of said vehicle;

comparator means for comparing the measured speed against the speed limit;

a vehicle transmitter responsive to said comparator means for sending radio signals indicative of a given relation between said measured speed and said speed limit and indicative of said driver identification and said vehicle identification;

said monitor transceivers including monitor receivers for receiving said radio signals from said vehicle transmitter for reporting the given speed relation, driver identification and vehicle identification to said central processor.

3. The invention according to claim 2 wherein said vehicle transceiver includes run enable means operatively connected with said vehicle and disabling operation thereof without both said driver and said vehicle identification entry.

4. The invention according to claim 3 comprising vehicle tamper means mounted in said vehicle and monitoring said vehicle transceiver and responsive to tampering with the latter to transmit radio signals indicative of said vehicle identification and said tampering.

5. The invention according to claim 4 wherein said tamper means comprises a self-contained unit responsive to disconnection of said vehicle transceiver to transmit said tamper signal.

6. The invention according to claim 3 comprising vehicle tamper means mounted in said vehicle and monitoring said vehicle transceiver and responsive to tampering with the latter to actuate said run enable means to said disabling mode to prevent vehicle operation.

7. The invention according to claim 2 wherein said vehicle transceiver includes nonvolatile memory means for recording said reported given speed relation, and display and recall means for later retrieval and documented corroboration.

8. The invention according to claim 2 wherein said vehicle transceiver includes warning means responsive to said comparator means for issuing a caution signal to the vehicle driver indicative of a first relation between said measured speed and said speed limit.

9. The invention according to claim 8 wherein said warning means further issues a reporting signal to the vehicle driver indicative of said given relation between said measured speed and speed limit and said reporting thereof to said central processor.

10. The invention according to claim 2 wherein:

said monitor transceivers send said radio signals containing speed limit information and containing synchronizing vehicle reply commands; and said vehicle transceiver detects said reply commands and initiates a delay listening for other vehicle transmissions, and then transmits a response to said monitor transceiver if no other vehicle transmissions are detected at the end of said delay.

11. The invention according to claim 10 wherein said vehicle transceiver responds to detection of other vehicle transmissions at the end of its said delay by restarting its said delay and checking again at the end thereof for other vehicle transmissions, and repeating such sequence until there is clear air space with no other vehicle transmissions at the end of a restarted said delay and then responding to said monitor transceiver.

12. The invention according to claim 11 wherein said delay is individually predetermined for each vehicle by said identification entry.

13. The invention according to claim 12 wherein said driver identification entry comprises Social Security number, and said delay is determined by the sum of the Social Security number digits.

14. A traffic surveillance system comprising:

(A) a vehicle transceiver mounted in a vehicle, comprising:

(1) a velocity surveillance computer;

(2) key detector means communicating with said vehicle surveillance computer and signaling the presence of an ignition key;

(3) driver identification reader means communicating with said vehicle surveillance computer for reading authorized driver identification codes;

(4) driver interface means communicating with said vehicle surveillance computer for communicating with the driver;

(5) speedometer means measuring the speed of said vehicle and communicating with said vehicle surveillance computer;

(6) programming plug means communicating with said vehicle surveillance computer for entering information including vehicle identification and permitting programming only by authorized personnel;

(7) nonvolative memory means communicating with said vehicle surveillance computer for storing data, including speed limit violations and driver identification;

(8) receiver means communicating with said vehicle surveillance computer for receiving broadcast radio signals indicating speed limit;

(9) transmitter means communicating with said vehicle surveillance computer for sending radio signals indicative of driver identification, vehicle identification, and speed limit violation;

(10) a tamper computer communicating with said vehicle surveillance computer and removable as a self-contained unit;

(11) second nonvolatile memory means communicating with said tamper computer for storing tamper data;

(12) run enable circuitry communicating with said tamper computer for enabling and disabling operation of said vehicle; and (B) set of monitor transceivers located along a roadway and communicating with a central processor, and including at least some stationary transceivers each comprising:

(1) a monitor surveillance computer;

(2) programming plug means communicating with said monitor surveillance computer for programing thereof;

(3) nonvolatile memory means communicating with said monitor surveillance computer for storing data;

(4) gating switch selection circutry for controlling communication of said monitor surveillance computer with said central processor and said vehicle transceiver;

(5) monitor transmitter means for sending radio signals indicative of speed limit in the location of the monitor transceiver; and (6) monitor receiver means for receiving radio signals from said vehicle transceiver for reporting speed limit violations together with driver identification and vehicle identification to said central processor.

15. The invention according to claim 14 wherein said vehicle transceiver compares the measured speed from said speedometer means with the speed limit received from said monitor transceiver to determine a speed limit violation on board said vehicle surveillance computer, for transmission to said monitor transceiver and subsequent reporting thereby to said central processor.

16. The invention according to claim 15 wherein:

the radio signals sent by said monitor transceiver include a synchronizing vehicle reply command which concurrently starts timers in each of the receiving vehicles in that area at the same instant to initiate in each vehicle a delay listening for other vehicle transmissions, each vehicle transceiver having a dedicated delay length;

each vehicle transceiver transmits a response to said monitor transceiver if no other vehicle transmissions are detected at the end of its respective delay, and repeats such delay if other vehicle transmissions are present, until there is clear air space at the end of a repeated such delay before transmitting to said monitor transceiver;

said system has two frequencies:

a vehicle transmit frequency which is the same for all vehicles and which is the same as the monitor receive frequency; and a vehicle receive frequency which is the same as the monitor transmit frequency; and said vehicle transceiver further include second receiver means for detecting the carrier frequency of other vehicle transmissions on said vehicle transmit frequency.

17. The invention according to claim 14 comprising two types of said monitor transceivers:

a first type monitor transceiver transmitting a code to said vehicle transceivers to reply only if there is a given relation between measured vehicle speed and the speed limit; and a second type monitor transceiver sending a command to said vehicle transceiver to reply regardless of said given relation;

and wherein said second type monitor transceiver further comprises vehicle detection means communicating with said monitor surveillance computer such that said second type monitor transceiver sends said command to said vehicle surveillance computer such that the latter replies to said second type monitor transceiver when a vehicle is detected by said vehicle detection means.

18. The invention according to claim 17 wherein absence of a reply from said vehicle transceiver indicates improper operation or tampering with the vehicle's velocity surveillance system, and wherein such information is transmitted by said monitor transceiver to said central processor.

19. The invention according to claim 18 wherein said monitor transceiver sends a signal to said vehicle transceiver indicating said improper operation, which if received is stored in said second nonvolatile memory means communicating with said tamper computer for storing tamper data.

* * * * *